United States Patent
Sakai

(10) Patent No.: US 7,079,297 B2
(45) Date of Patent: Jul. 18, 2006

(54) OPTICAL SCAN DEVICE, IMAGE POSITION CALIBRATION METHOD, AND IMAGE DISPLAY DEVICE

(75) Inventor: Yoshitsugu Sakai, Kanagawa (JP)

(73) Assignee: Sony Coporation (JP)

(*) Notice: Subject to any disclaimer, the term of this patent is extended or adjusted under 35 U.S.C. 154(b) by 148 days.

(21) Appl. No.: 10/493,231

(22) PCT Filed: Sep. 30, 2003

(86) PCT No.: PCT/JP03/12494

§ 371 (c)(1),
(2), (4) Date: Apr. 21, 2004

(87) PCT Pub. No.: WO2004/031832

PCT Pub. Date: Apr. 15, 2004

(65) Prior Publication Data

US 2004/0263932 A1    Dec. 30, 2004

(30) Foreign Application Priority Data

Oct. 1, 2002  (JP) .............................. 2002-288463

(51) Int. Cl.
  *G02B 29/08*  (2006.01)
  *G09G 1/04*   (2006.01)

(52) U.S. Cl. ................. 359/196; 359/213; 359/214; 250/236

(58) Field of Classification Search ..................... None
See application file for complete search history.

(56) References Cited

U.S. PATENT DOCUMENTS

| | | | |
|---|---|---|---|
| 5,341,072 A * | 8/1994 | Watanabe et al. | ............ 315/408 |
| 5,841,579 A | 11/1998 | Bloom et al. | |
| 5,982,553 A | 11/1999 | Bloom et al. | |

FOREIGN PATENT DOCUMENTS

| | | |
|---|---|---|
| JP | 03-164824 | 7/1991 |
| JP | 11-146222 | 5/1999 |
| JP | 11-271626 | 10/1999 |
| JP | 2002-228957 | 8/2002 |

* cited by examiner

*Primary Examiner*—James Phan
(74) *Attorney, Agent, or Firm*—Rader, Fishman & Grauer PLLC; Ronald P. Kananen

(57) ABSTRACT

An optical scanning device, a correction method of the position of an image, an image display method, and an image display device able to improve a light projection efficiency and lower the electric power and able to reduce error of the projection image along with an increase in efficiency of light projection in an image display device for scanning by a one-dimensional image to generate a two-dimensional image are provided. In the image display device, a scanning means (2) scans in both an outgoing path and a return path direction to project the light. The image display device is provided with an angle sensor 16 for reading the angle of the scanning means (2) and a position sensitive detector (15) for detecting the position of the projection light. A system control circuit (10) processes the obtained angle data and position data at an angle data correction unit (13) and a light position detection unit (14) to determine the phase delay of the output of the angle sensor (16) and adjusts a modulation/projection timing so as to correct the phase delay and match the positions of the image projected in the outgoing path and the return path.

7 Claims, 22 Drawing Sheets

SAW-TOOTH WAVE DRIVING METHOD

TRIANGULAR WAVE DRIVING METHOD

FIG. 13A  FRMsync

FIG. 13B  SAS

FIG. 14A FRMsync

FIG. 14B SAS

FIG. 14C SPD-SIG

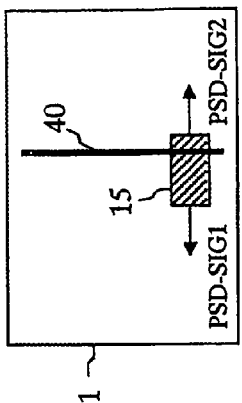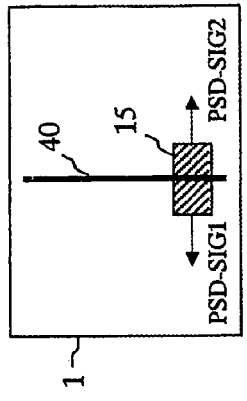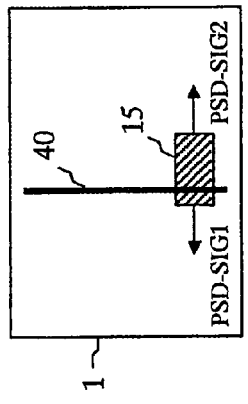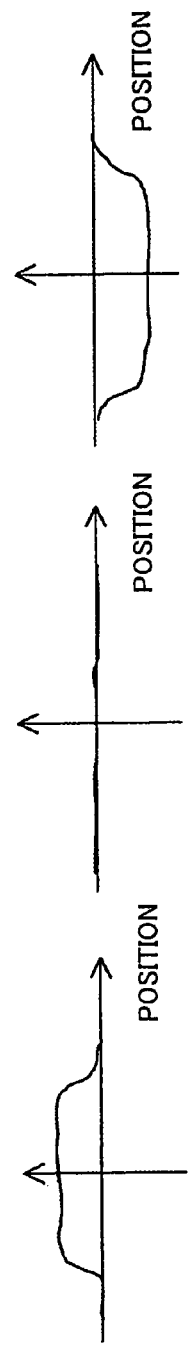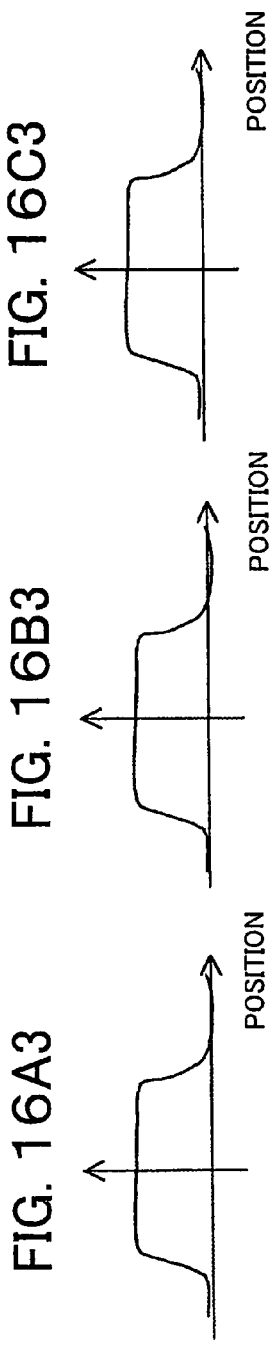

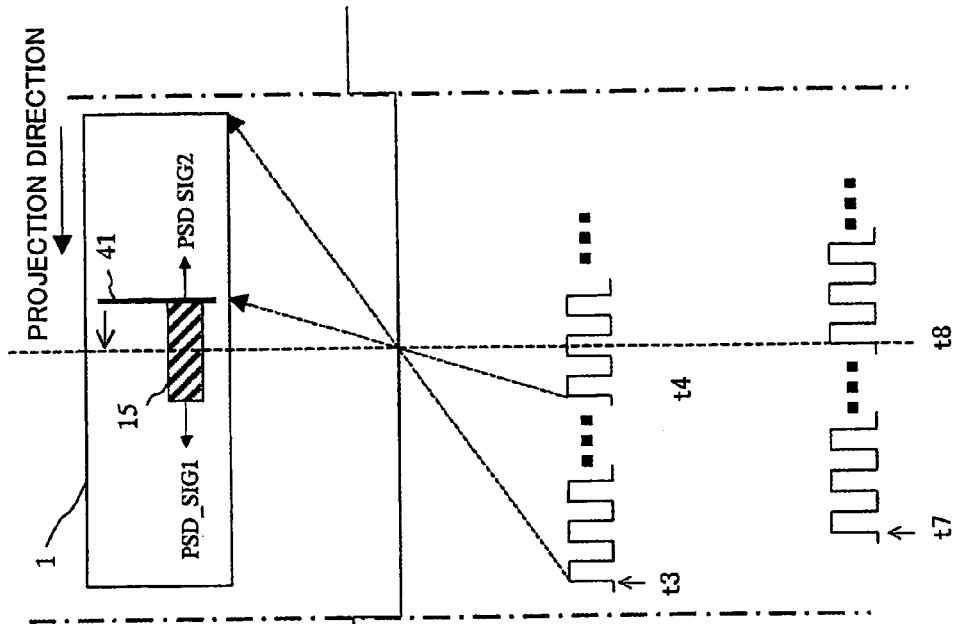
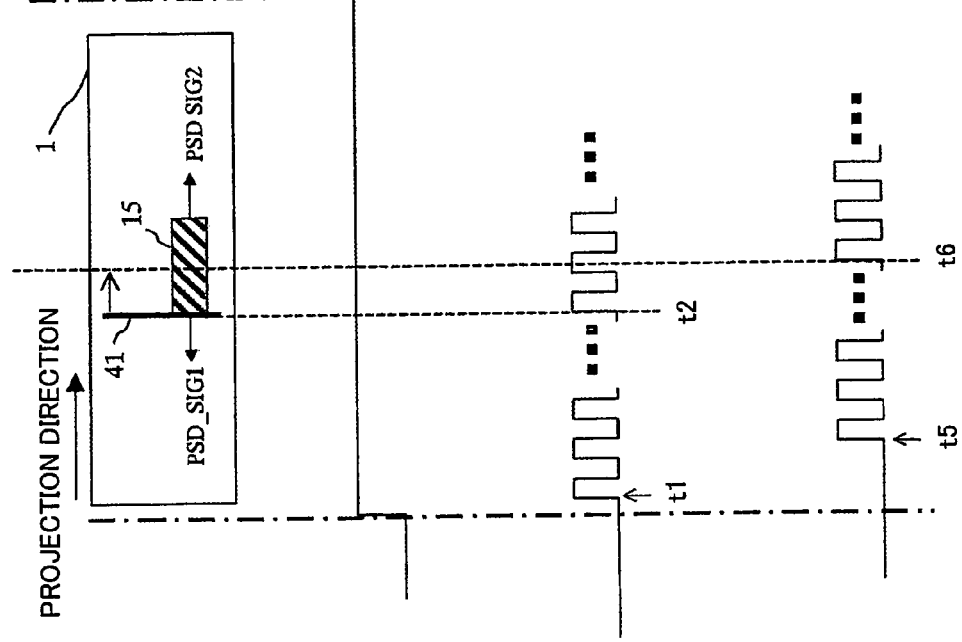
FIG. 18A
FIG. 18B FRM_sync
FIG. 18C RQT1
FIG. 18D RQT2

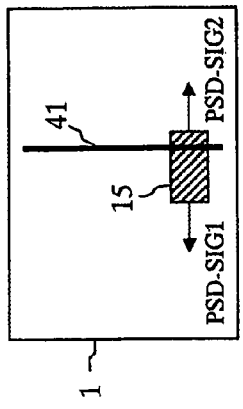
FIG. 19A1
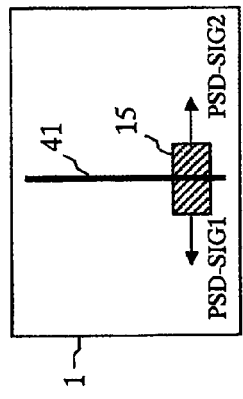
FIG. 19B1
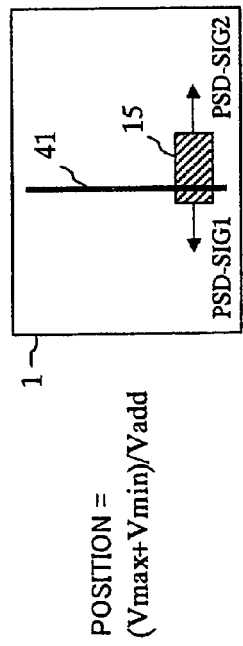
FIG. 19C1
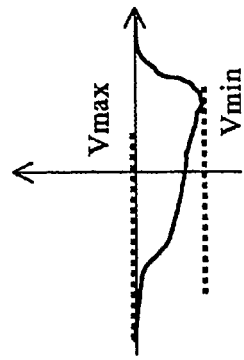
FIG. 19A2
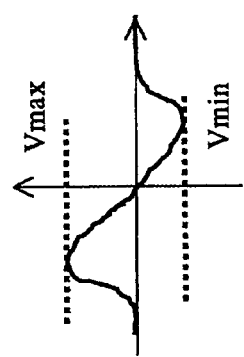
FIG. 19B2
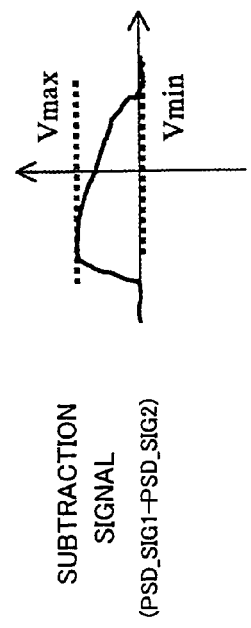
FIG. 19C2
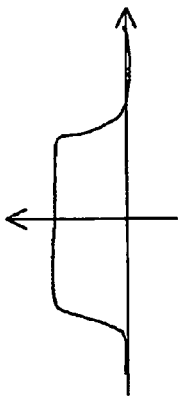
FIG. 19A3
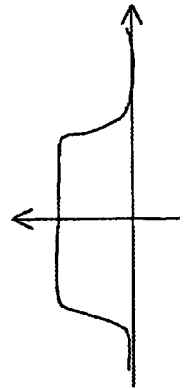
FIG. 19B3
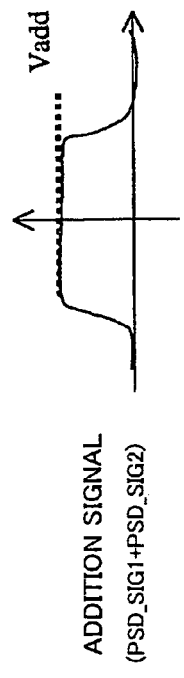
FIG. 19C3
POSITION = (Vmax+Vmin)/Vadd
SUBTRACTION SIGNAL (PSD_SIG1−PSD_SIG2)
ADDITION SIGNAL (PSD_SIG1+PSD_SIG2)

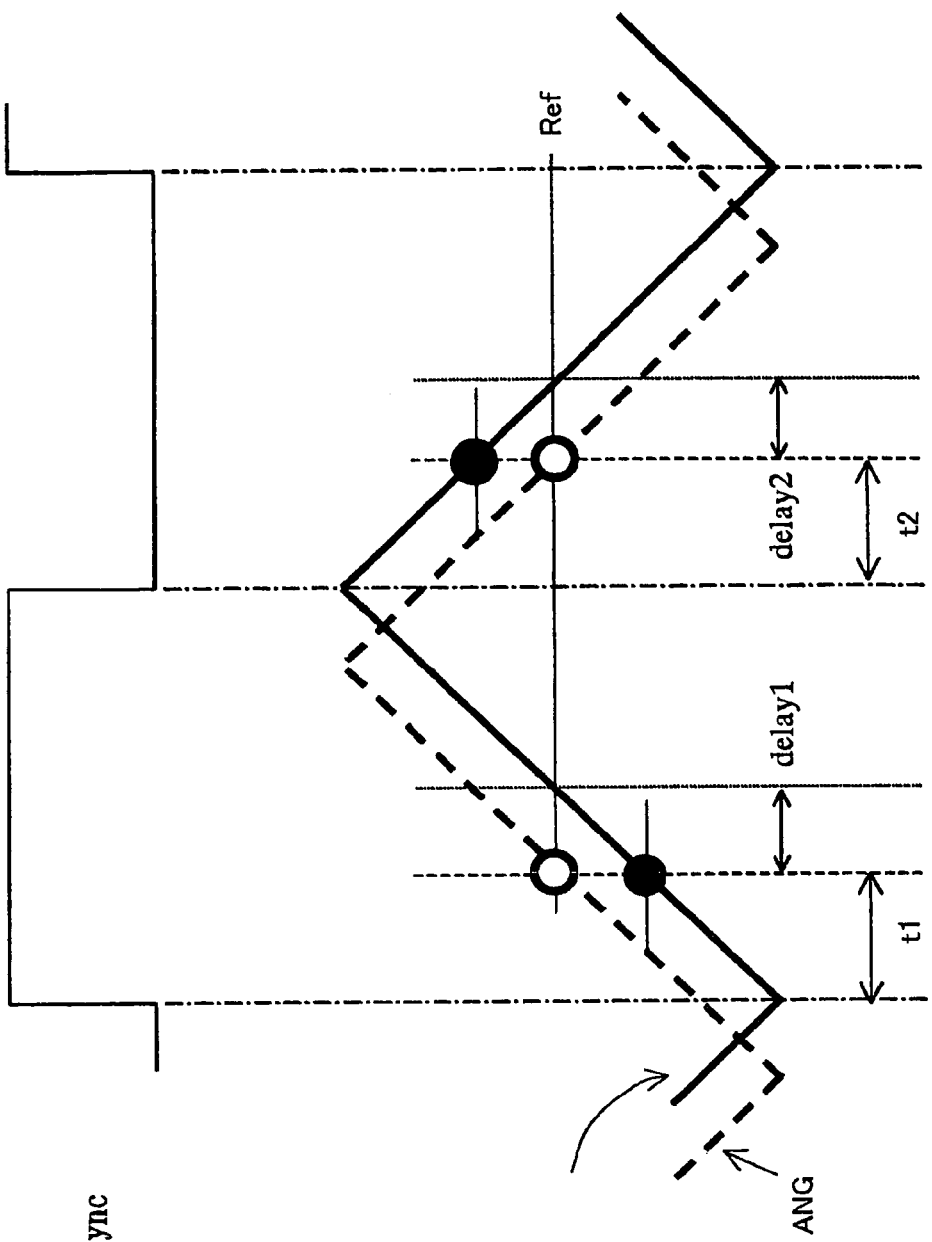
FIG. 20A FRMsync
FIG. 20B SAS

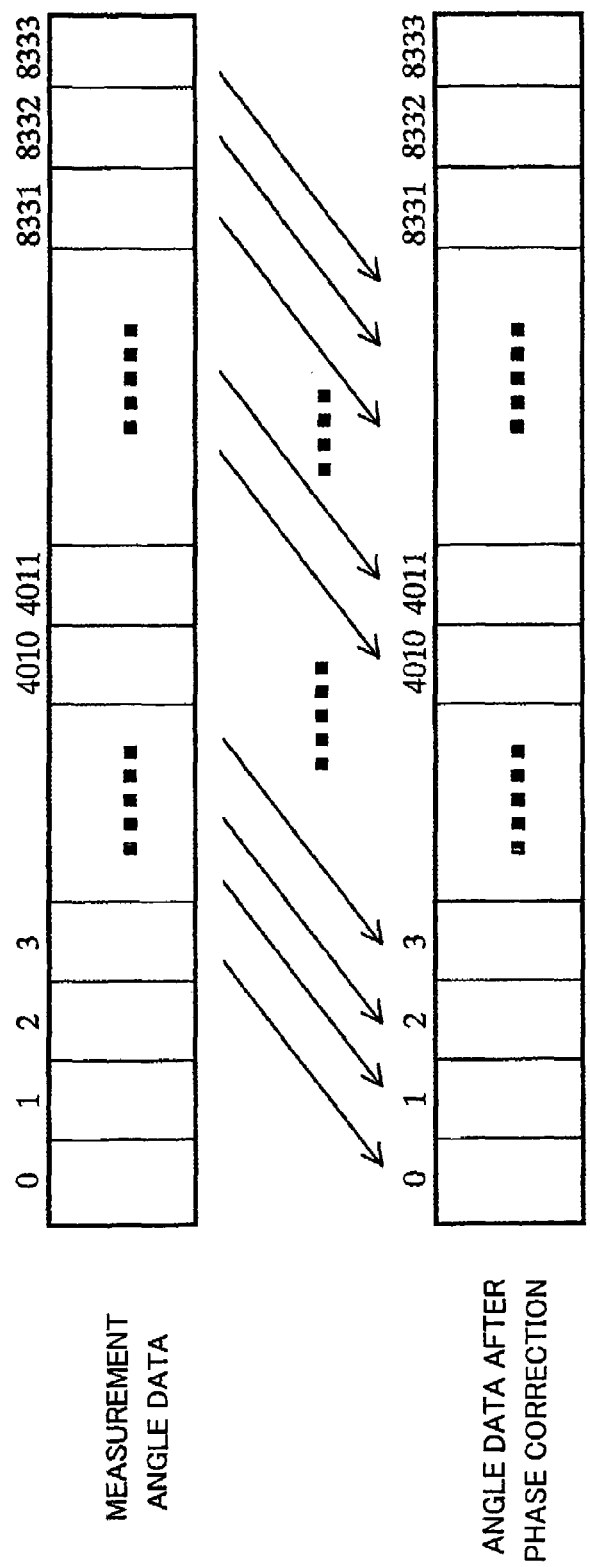

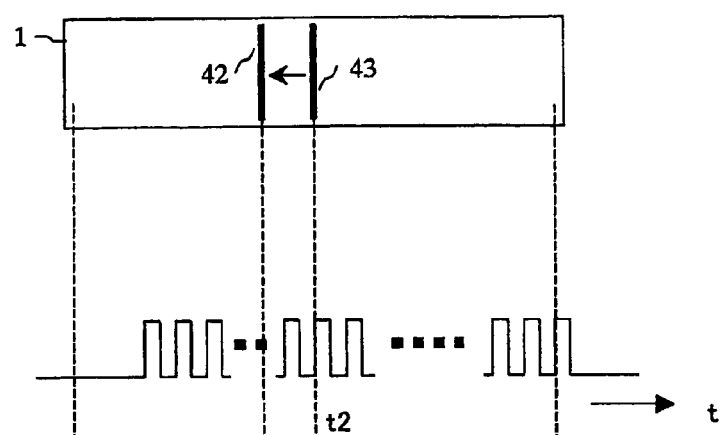
FIG. 22A
FIG. 22B
RQT3
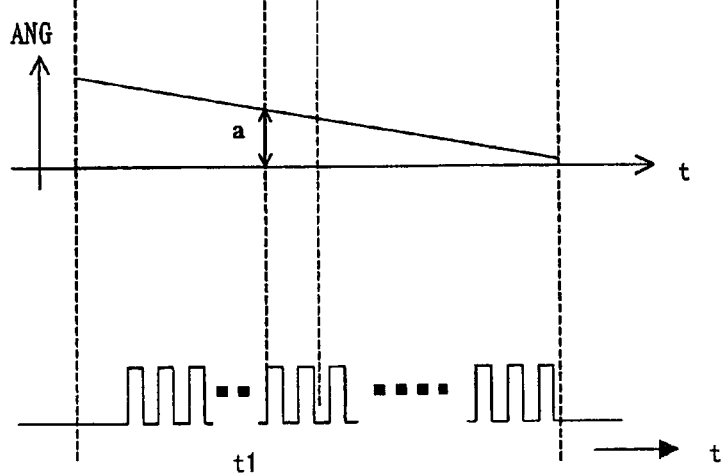
FIG. 22C
ANG
FIG. 22D
RQT4

OPTICAL SCAN DEVICE, IMAGE POSITION CALIBRATION METHOD, AND IMAGE DISPLAY DEVICE

TECHNICAL FIELD

The present invention relates to an optical scanning device for displaying an image based on for example a Grating Light Valve™ or other light modulation element by a projection optical system on a screen or other image displaying means, a correction method of the position of a displayed image, and an image display device using the optical scanning device.

BACKGROUND ART

In a projector, printer, or another image forming device, to improve the resolution of the image, there is known the method of scanning by light rays from a one-dimensional image display element by a scan mirror or other optical scanning device while projecting images onto an image forming means to form a twodimensional image (for example, refer to U.S. Pat. No. 5,982,553).

As a one-dimensional pixel display device, a Grating Light Valve™ (GLV) developed by Silicon Light Machines of the U.S. is known (for example, Japanese Examined Patent Publication (Kokoku) No. 3164824 and U.S. Pat. No. 5,841,579).

In comparison with the usual two-dimensional display device, when using a GLV, while the number of pixels in the vertical direction becomes the same, just one is sufficient in the horizontal direction, so the number of pixels required for the two-dimensional image display is smaller. Further, the electrode portions, referred to as "ribbon elements", of the GLV are very small in size (about 1×40 µm), therefore a high resolution, a high switching speed, and a display of a wide bandwidth are possible. On the other hand, a low application voltage is used for the operation, so realization of very small sized display devices can be expected.

Referring to FIG. 1 to FIG. 3, the general configuration of an image display device using a GLV will be simply explained.

FIG. 1 is a view of an example of the configuration of an image display device using a GLV.

An image display device 100 shown in FIG. 1 has a screen 101, a scan mirror 102, a scanner motor 103, a projection optical system 104, a one-dimensional light modulation element 105 formed by a GLV device, a drive circuit 106 for supplying a drive voltage to the GLV device 105, an interface circuit 107, a video data conversion circuit 108, a scanner driver 109, and a system control circuit SYS-CNT 110. The configuration including the scan mirror 102 and the scanner motor 103 will be referred to as a "scanner 102a".

For example, a light source LS comprising a plurality of semiconductor lasers emits red (R), green (G), or blue (B) illumination light rays. The illumination light rays are converted to parallel beams by a not illustrated illumination optical system and irradiated to the GLV device 105.

The GLV 105 is formed by a plurality of pixels arrayed one-dimensionally. A drive voltage in accordance with the image to be displayed is supplied to the GLV device 105 by the drive circuit 106. The GLV device 105 reflects or diffracts the incident illumination light in response to this and emits the reflected light or the diffracted light to the projection optical system 104.

The projection optical system 104 converts the reflected light or the diffracted light emitted from the GLV device 105 to parallel beams. Further, the projection optical system 104 separates the ±1st order diffracted light and 0 order light, passes the ±1st order diffracted light to make it reach the scan mirror 102, and blocks the 0 order light. Further, the projection optical system 104 enlarges mainly the one-dimensional image formed by the ±1st order diffracted light from the GLV device 105 and projects and focuses it onto the screen 101 via the scan mirror 102.

The scanner motor 103 is driven by a scanner drive signal SDS from the scanner driver 109 and reciprocally rotates the linking scan mirror 102. The scan mirror 102 scans by ±1st order diffracted light including the one-dimensional image emitted from the projection optical system 104 and sequentially emits it to the screen 101 while reciprocally rotating to form a two-dimensional image. The scan mirror 102 is for example a galvano mirror.

The video data VD input to the image display device 100 is for example a color difference signal YCbCr (YPbPr) input from a DVD or other video player. In order to process it at the image display device 100, the video data conversion circuit 108 and the interface circuit 107 convert the format of the input video data and output it to the drive circuit 106 for every one-dimensional image (referred to as "one line").

The system control circuit SYS-CNT 110 has a CPU 111 and a memory 112 and distributes a frame synchronization signal FRMsync for synchronizing the components of the image display device 100. Further, it outputs basic data for driving the scan mirror 102 and a scanner instruction signal SIS including a phase, an amplitude, and cycle information for the data. Further, it generates a modulation/projection signal RQT indicating the modulation and projection timings of the GLV device 105 using various types of data.

FIG. 2A is a view schematically explaining a scanning operation of the scan mirror 102, while FIG. 2B shows a two-dimensional image formed on the screen 101 by the scanning of the scan mirror 102.

As shown in FIG. 2A, the scan mirror 102 sequentially irradiates the one-dimensional image light projected from the projection optical system 104 to the screen 101 while reciprocally rotating within a predetermined angle range so as to form a two-dimensional image on the screen 101.

The scanner 102a (scan mirror 102 and scanner motor 103) is driven by a saw-tooth wave-like signal shown in FIG. 3.

As shown in FIG. 3, when driving the scanner 102a by a saw-tooth wave-like signal having an asymmetric rising characteristic (time and amplitude) and falling characteristic (time and amplitude) and exhibiting a saw-tooth like shape, an illustrated drive voltage is supplied to the scanner 102a and the scanner 102a is driven in the periods T1a and T1. In the period T1a, the scan mirror 102 has a rotational speed accelerated from zero to a predetermined speed. In the period T1, the scan mirror 102 rotates at a constant speed from a position "a" to a position "c" while passing a position "b" along an outgoing direction shown in FIG. 2A, reflects the incident one-dimensional image light at each position, emits light rays La, Lb, and Lc to the screen 101, and forms the one-dimensional images Sa, Sb, and Sc shown in FIG. 2B.

In the period T1 shown in FIG. 3, the scan mirror 102 rotates up to the position c.

Thereafter, in the period T2 shown in FIG. 3, the scan mirror 102 decelerates until the rotational speed becomes zero and starts to rotate in reverse while accelerating along a return direction shown in FIG. 2A.

In the period T2, the scan mirror 102 rotates in the return direction, but in the T2 period, the scan mirror 102 only returns to its original position for the next projection and does not project or focus the image.

As described above, when projecting an image by scanning in accordance with a saw-tooth wave-like signal, the image is projected for only the T1 period and is not projected in a movement time T2 in the return direction, so a useless time T2 was generated. Therefore, the light projection efficiency of the scanner 102a was low. When trying to raise the light projection efficiency of the scanner 102a, there is the method of shortening the movement time T2 in the return direction, but a large power must be supplied to the scan mirror 102 in order to return the scan mirror 102 in a short time. For this reason, there was the problem that there was a demand for increasing the amount of the electric power of the scanning device and for raising the mechanical strength of the scan mirror. The scanning device became large in size and expensive to realize this.

DISCLOSURE OF THE INVENTION

A first object of the present invention is to provide a light scanning device in an image display device scanning by a one-dimensional image obtained by a one-dimensional light modulation element to generate a two-dimensional image which can improve the light projection efficiency and lower the electric power and which can reduce error of the projected image accompanying increased efficiency of light projection and a correction method of the position of an image in the light scanning device.

A second object of the present invention is to provide an image display device using the light scanning device and the correction method of the position of an image described above.

According to a first aspect of the present invention, there is provided a light scanning device deflecting incident light modulated in accordance with video data and scanning by the incident light over a scanned surface to form an image, including a scanning means which is rotated in a forward rotation direction and a reverse rotation direction and deflecting the incident light in accordance with the forward rotation and the reverse rotation and a correcting means for matching the position of an image formed by scanning by the incident light deflected in accordance with the forward rotation on the scanned surface and the position of an image formed by scanning by the incident light deflected in accordance with the reverse rotation on the scanned surface.

Namely, the light scanning device projects the image in both of the forward rotation direction and the reverse rotation direction to improve the light projection efficiency. When projecting an image in both of the forward rotation direction and the reverse rotation direction, the projection positions of the image in the forward rotation direction and the image in the reverse rotation direction must be matched. In the present invention, a correcting means for correcting the position of an image is provided to match the projection positions of the image in the forward rotation direction and the image in the reverse rotation direction.

Preferably, when using an angle detecting means to measure a real rotation angle of the scanning device and form one frame, real rotation angle data of the scanning device for each time is stored in the storing means. The modulation controlling means calculates a time corresponding to each real rotation angle of the scanning means from the stored angle data and outputs an instruction for determining the timings of the modulation of the video data and the projection of the scanning means at that time.

More preferably, the angle detecting means reads the rotation angle of the scanning means at any time and measures a phase delay of each rotation angle data of the scanning means output by the angle detecting means based on the result of the read angle. The angle data of the time when a time in accordance with the amount of phase delay elapses is made the "real rotation angle".

Further preferably, a light position measuring means is provided, the angle data at a time when the scanning means stops and the angle data at a time when the scanning means rotates are measured, and the phase delay of each rotation angle data of the scanning means is measured from the difference.

According to a second aspect of the present invention, there is provided a method of rotating a scanning means in a forward rotation direction and a reverse rotation direction deflecting incident light modulated in accordance with video data in accordance with the forward rotation and the reverse rotation, and correcting the position of an image formed on the scanned surface by the deflected incident light, the correction method of the position of an image having a correction step of matching the position of an image formed by scanning by the incident light deflected in accordance with the forward rotation on the scanned surface and the position of an image formed by scanning the incident light deflected in accordance with the reverse rotation on the scanned surface.

According to a third aspect of the present invention, there is provided an image display device including a light illuminating means; a light modulation element for modulating incident light from the illuminating means in accordance with input video data and emitting image-forming light for forming a one-dimensional image; a scanning means rotating in a forward rotation direction and a reverse rotation direction in accordance with the video data and deflecting the image-forming light; a correcting means for matching the position of an image formed by scanning by the image-forming light deflected in accordance with the forward rotation on the scanned surface and the position of an image formed by scanning by the image-forming light deflected in accordance with the reverse rotation on the scanned surface; and a displaying means irradiated by the corrected image-forming light and displaying a two-dimensional image.

BRIEF DESCRIPTION OF THE INVENTION

FIG. 16A1 to FIG. 16C3 are views for explaining a method of measuring the position of light in the measurement of the reference angle of the scan mirror and the reference value of the angle signal in the system control circuit.

Figure 6:
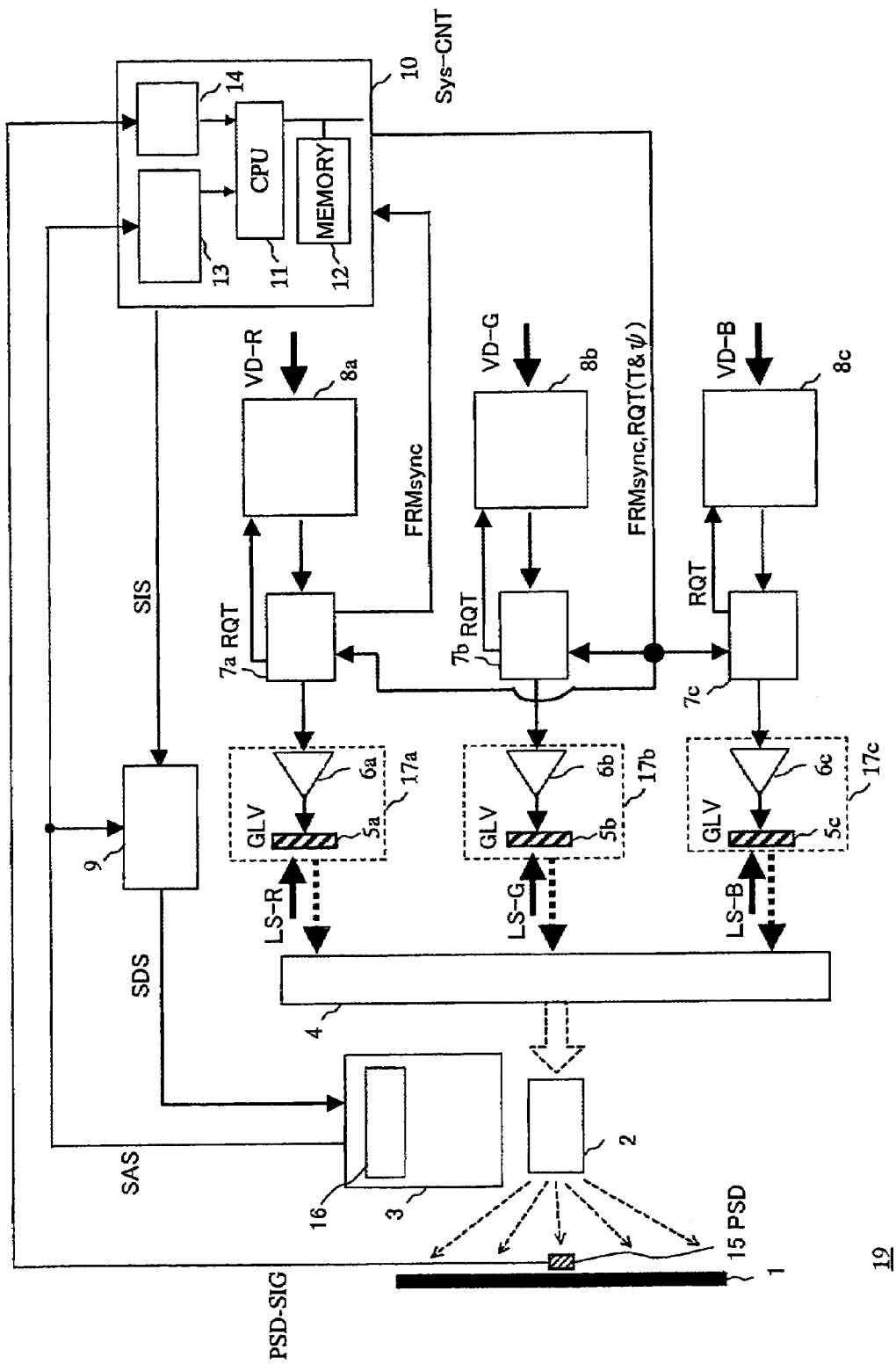
FIG. 6 is a view of an example of the configuration of an adjusting means of the image display device and the scan system according to an embodiment of the present invention.
Figure 17:
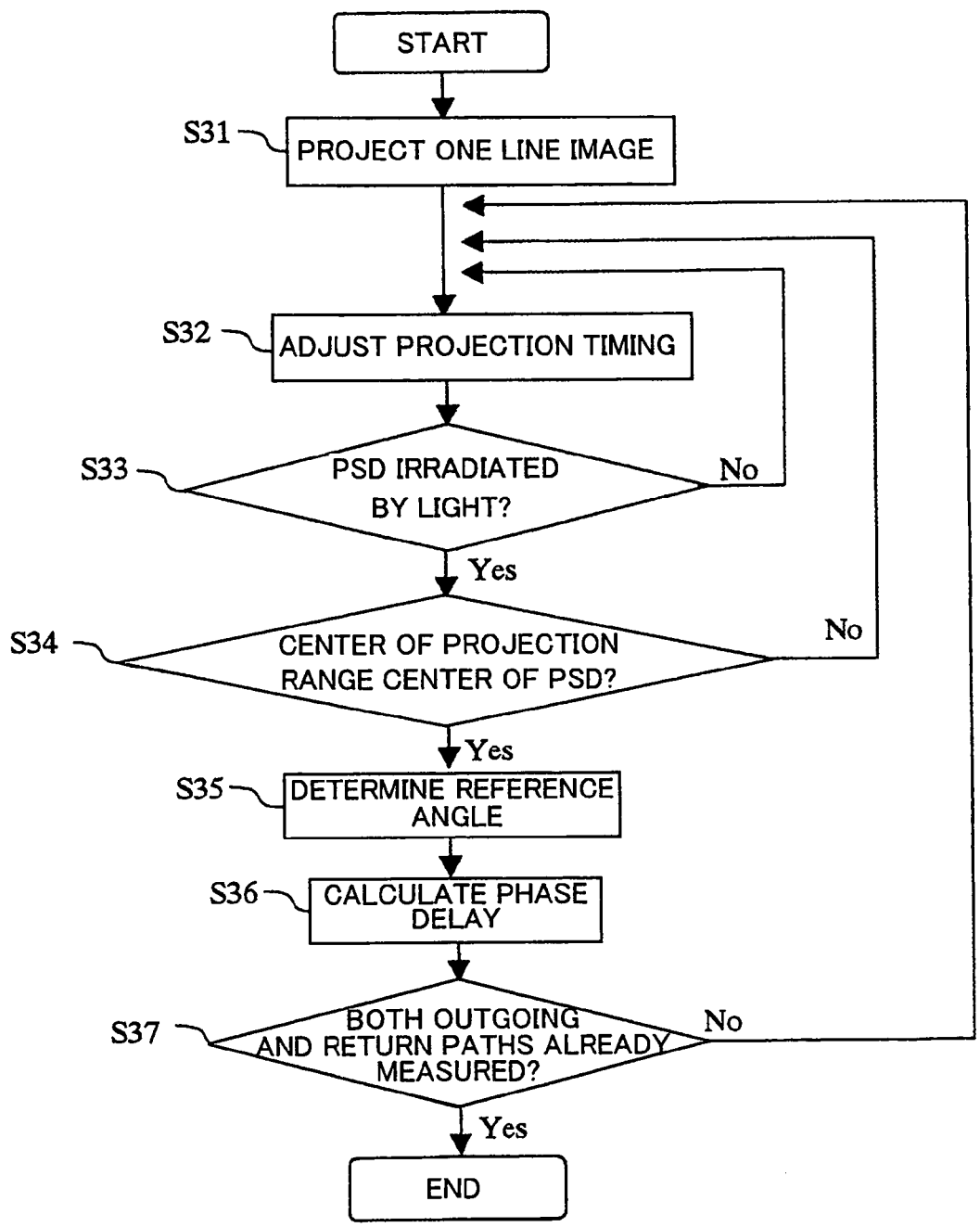

FIG. 17 is a flow chart for explaining a method of measuring a phase delay of the angle signal with respect to the actual angle of the scan mirror in the system control circuit of an image display device according to the embodiment of the present invention illustrated in FIG. 6.

FIG. 18A to FIG. 18D are views for explaining a method of matching positions of the projection light by adjusting the timing of the modulation/projection signal in the measurement of the phase delay of the angle signal in the system control circuit.

FIG. 19A1 to FIG. 19C3 are views for explaining a method of measuring a position of light in the measurement of a phase delay of an angle signal in the system control circuit.

FIG. 20A and FIG. 20B are views for explaining a method of calculating a phase delay of an angle signal in the system control circuit in an image display device according to the embodiment of the present invention illustrated in FIG. 6.

FIG. 21 is a view for explaining a method of finding an actual angle of a scan mirror by correcting a phase delay of an angle signal in the system control circuit of ah image display device according to the embodiment of the present invention illustrated in FIG. 6.

FIG. 22A to FIG. 22D are views for explaining processing for forming a one-dimensional image by matching the modulation/projection timing and the rotation angle of a scan mirror in the system control circuit of an image display device according to the embodiment of the present invention illustrated in FIG. 6.

BEST MODE FOR CARRYING OUT THE INVENTION

Below, an embodiment of a light scanning device of the present invention, a correction method of the position of an image, an image display method using the same, and an image display device will be explained by referring to the attached drawings.

[Triangular Wave Drive System]

The scanning method of the present invention will be explained by referring to FIG. 4 and FIG. 5.

Figure 4:
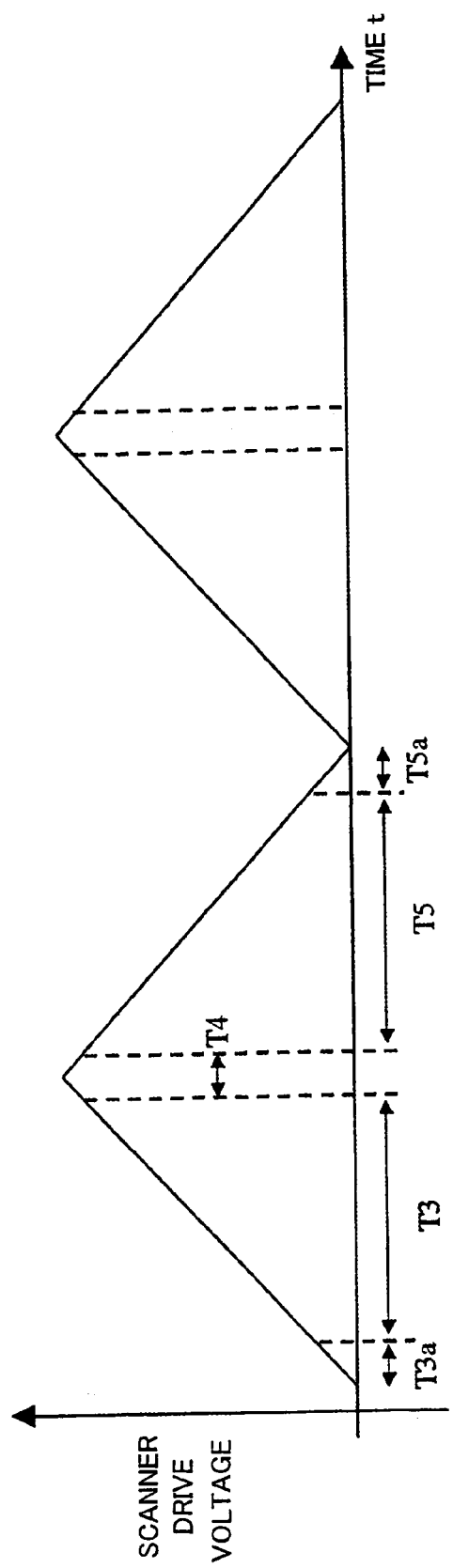
FIG. 4 is a view for explaining a triangular wave signal having a symmetric rising characteristic and falling characteristic for driving the scan mirror in the image display device according to an embodiment of the present invention.
Figure 5:
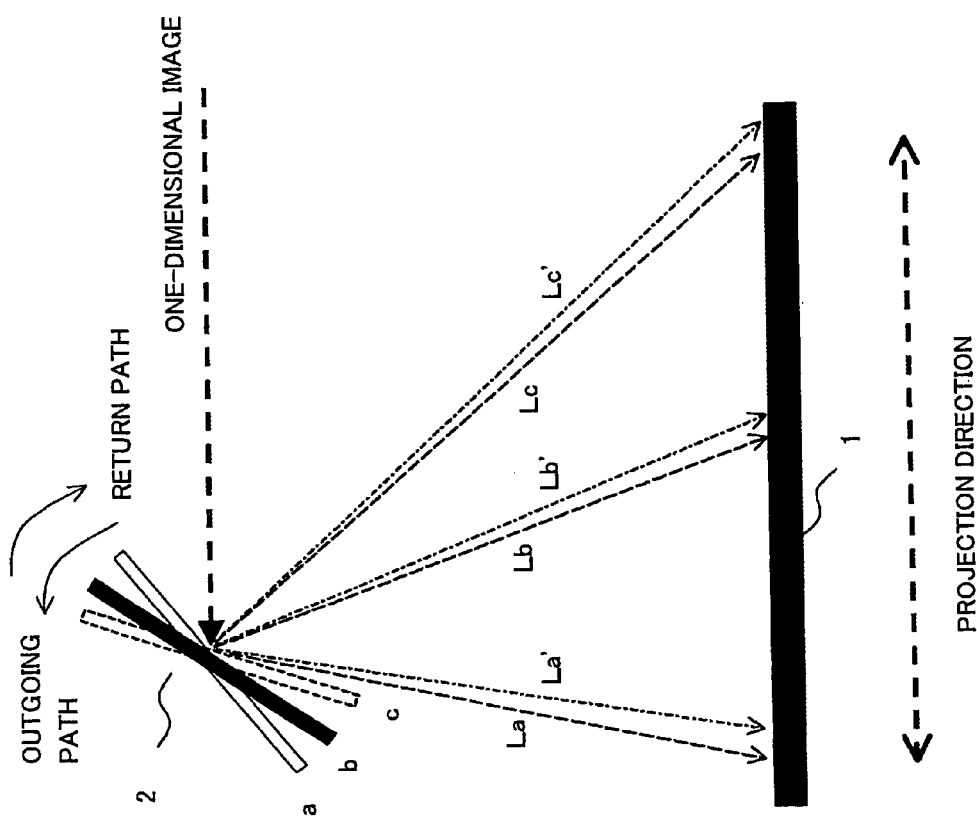
FIG. 5 is a view of the state of forming a two-dimensional image by reciprocal scanning of the scan mirror in the image display device according to an embodiment of the present invention.

FIG. 4 is a view of a triangular wave signal for controlling a scanning device in the present embodiment, while FIG. 5 is a view for schematically explaining a scanning operation of a scan mirror according to the present embodiment.

Figure 3:
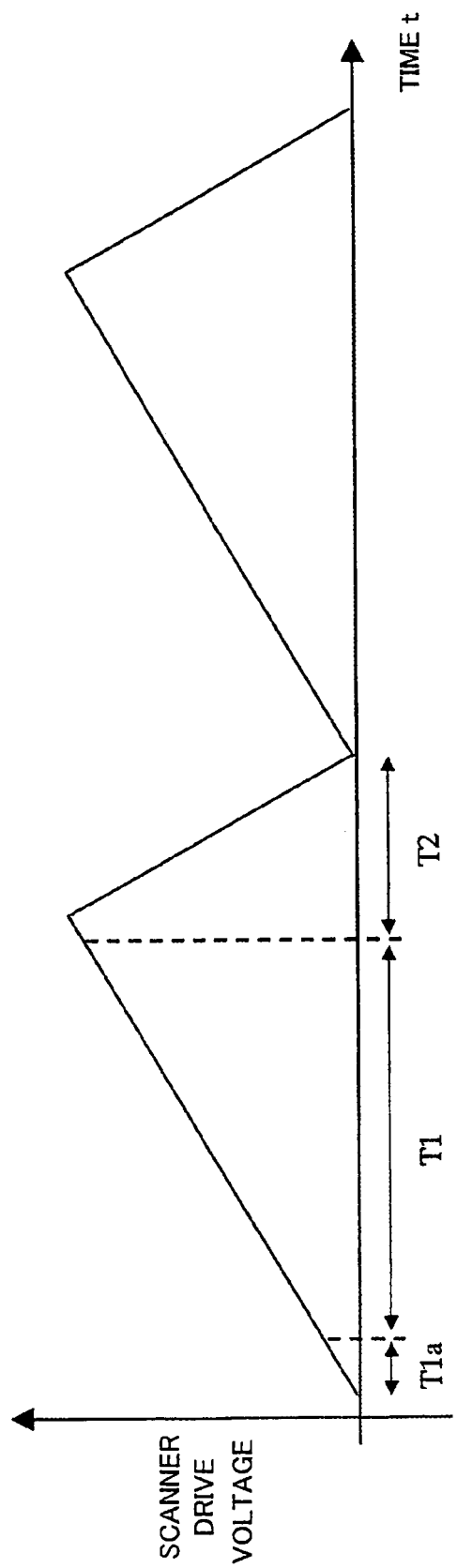
FIG. 3 is a view for explaining a saw-tooth wave signal for driving the scan mirror, having an asymmetric rising characteristic and falling characteristic, and exhibiting a saw-tooth shaped waveform.

Note that in the description and drawings, a "triangular wave signal" means a signal of a waveform where the rising characteristic (time and amplitude) and the falling characteristic (time and amplitude) are symmetric as illustrated in FIG. 4. Contrary to this, a "saw-tooth wave signal" means a signal of a waveform where the rising characteristic (time and amplitude) and the falling characteristic (time and amplitude) are asymmetric as illustrated in FIG. 3.

In an image display device according to the embodiment of the present invention, when reciprocally rotating the scan mirror, light is projected in both of an outgoing path and a return path and the light projection efficiency is improved.

In the present embodiment, the drive signal of the triangular wave shown in FIG. 4 drives the scan mirror shown in FIG. 5 to realize the reciprocal light projection.

When driving a scanner by a signal of the triangular wave shown in FIG. 4, the scan mirror 2 shown in FIG. 5 reciprocally rotates by the drive voltage. Specifically, in a period T3a shown in FIG. 4, the scan mirror 2 is accelerated to a predetermined rotational speed. In a period T3 shown in FIG. 4, the scan mirror 2 rotates from a position "a" to a position "c" while passing the position "b" at the above predetermined speed along the outgoing direction shown in FIG. 5, reflects the incident light rays for displaying a one-dimensional image at each position, and emits the light rays La, Lb, and Lc to the screen 1.

In a period T4 shown in FIG. 4, the scan mirror 2 decelerates until the rotational speed becomes zero, then starts to rotate in reverse while accelerating up to a predetermined speed along the return direction shown in FIG. 5. In the period T4, the scan mirror 2 only changes the rotation direction for the projection in the return path and does not project and focus light.

In a period T5 shown in FIG. 4, the scan mirror 2 rotates from the position "c" to the position "a" while passing the position "b" at the above predetermined speed along the direction of the return path shown in FIG. 5, reflects the incident light rays for displaying a one-dimensional image at each position, and emits light rays Lc', Lb', and La' to the screen 1.

In a period T5a shown in FIG. 4, the scan mirror 2 is decelerated until the rotational speed becomes zero.

By the scanning of the scan mirror 2 by the triangular wave signal in this way, the scanner system projects light in both of the outgoing and return rotations, so the projection of the light becomes higher in efficiency and the mechanical demands on the scanner mirror are lowered.

One countermeasure for the disadvantage which must be solved when projecting light rays in both of the outgoing path and the return path is to match the projection positions of the outgoing path image and the return path image. When the characteristics of the scanner system are ideal, that is, under conditions where the actual angles in the outgoing and return paths of the scanner are symmetric, the rotational speed is always constant (except near a pole change point for inverting the rotation direction), etc., by establishing synchronization between the phase of the scanner and the one-dimensional image light projection timing and periodically projecting the one-dimensional image light, it is possible to match the outgoing path image and the return path image.

In an actual scanner system, however, the characteristics of the components, the physical conditions, the characteristics of the circuit configuration, etc. mean that symmetry of the outgoing and return paths will not completely be established. Even in the angle region excluding the vicinity of the pole change point, the rotational speed is not constant. Under such conditions, the rotation timing of the scanner and the one-dimensional image projection timing will not match. There is a possibility that deviation will be caused between the outgoing and return images.

Further, since the one-dimensional image is successively projected onto a screen by the rotation of the scan mirror, when the rotational speed of the scan mirror changes, the interval between the one-dimensional images on the screen will no longer be constant and the deviation caused in the images of the outgoing and return paths will not be unambiguously determined by the image position. For this reason, it is difficult to make the images as a whole match by only adjusting the phases of the one-dimensional images as a whole.

In this embodiment of the present invention, the above problem is overcome by providing an angle sensor to enable the angle of the scan mirror to be read at any time and by controlling the system to match the projection positions of the outgoing path image and the return path image based on the results of the read angle.

[Configuration of Image Display Device]

FIG. 6 is a view of an example of the configuration of an image display device 19 according to the present embodiment.

The image display device 19 shown in FIG. 6 has a screen 1, a scan mirror 2, a scanner motor 3, a projection optical system 4, one-dimensional light modulation elements 5a, 5b, and 5c for modulating the three primary color, that is, red (R), green (G), and blue (B), illumination light, drive circuits 6a, 6b, and 6c for outputting drive voltages to these one-dimensional light modulation elements 5a, 5b, and 5c, interface circuits 7a, 7b, and 7c, video data conversion circuits 8a, 8b, and 8c, a scanner driver 9, and a system control circuit 10.

GLVs are used for the one-dimensional light modulation elements 5a, 5b, and 5c. Note that, in the following description, the one-dimensional light modulation elements 5a, 5b; and 5c will be sometimes totally referred to as "one-dimensional light modulation elements 5".

In the present description, the circuits including the one-dimensional light modulation elements 5a, 5b, and 5c, the drive circuits 6a, 6b, and 6c thereof, etc. and converting the illumination light to one-dimensional images will be referred to as the "one-dimensional light modulation circuits 17a, 17b, and 17c".

For example, a plurality of light sources LS-R, LS-G, and LS-B made of semiconductor lasers emit the red (R), green (G), and blue (B) illumination light rays. The illumination light rays are converted to parallel beams by a not illustrated illumination optical system and irradiated to the one-dimensional light modulation elements 5a, 5b, and 5c.

The one-dimensional light modulation elements 5a, 5b, and 5c are formed by a plurality of pixels arrayed one-dimensionally. Drive voltages in accordance with the image to be displayed are supplied to the one-dimensional light modulation elements 5a, 5b, and 5c by the drive circuits 6a, 6b, and 6c. The one-dimensional light modulation elements 5a, 5b, and 5c reflect or diffract the incident illumination light in accordance with this and emit the reflected light or the diffracted light to the projection optical system 4.

The projection optical system 4 converts the reflected light or the diffracted light emitted from the one-dimensional light modulation elements 5a, 5b, and 5c to parallel beams. Further, the projection optical system 4 separates the ±1st order diffraction light and the 0 order light, passes the ±1st order diffraction light therethrough and makes it reach the scan mirror 2, and blocks the 0 order light. Further, the projection optical system 4 enlarges the one-dimensional image formed mainly by the ±1st order diffraction light from the one-dimensional light modulation elements 5a, 5b, and 5c and projects and focuses it onto the screen 1 via the scan mirror 2.

The video data conversion circuits 8a, 8b, and 8c and the interface circuits 7a, 7b, and 7c convert the red (R), green (G), and blue (B) video data VD-R, VD-G, and VD-B input to the image display device 19 in format and output them to the drive circuits 6a, 6b, and 6c for every line.

The scanner motor 3 is driven by the scanner drive signal SDS from the scanner driver 9 and rotates the linked scanner mirror 2 reciprocally. The scan mirror 2 sequentially scans by the ±1st order diffraction light emitted from the projection optical system 4 and emits it to the screen 1 while reciprocally rotating so as to lay out one-dimensional images and form a two-dimensional image. The scan mirror 2 is for example a galvano mirror.

The scanner motor 3 houses the angle sensor 16. Accordingly, in the present embodiment, the present angle of the scan mirror 2 linking with the scanner motor 3 is correctly found based on the rotation angle of the scanner motor 3 detected at the angle sensor 16, the angle signal SAS detected at the angle sensor 16 is output to the angle data correction unit 13 of the system control circuit SYS-CNT 10 and performs the processing for matching the outgoing path image and the return path image.

The system control circuit (SYS-CNT) 10 includes a CPU 11, a memory 12, an angle data correction unit 13, and a light position detection unit 14. The video data conversion circuits 8a, 8b, and 8c and the interface circuits 7a, 7b, and 7c distribute the frame synchronization signal FRMsync for establishing synchronization of the one-dimensional light modulation circuits 17a, 17b, and 17c including the one-dimensional light modulation elements 5a, 5b, and 5c and the drive circuits 6a, 6b, and 6c. Further, the SYS-CNT 10 outputs the basic data for driving the scan mirror 2 and a scanner instruction signal SIS including the phase, the amplitude, and the cycle information with respect to that data. Further, the SYS-CNT 10 generates a modulation/projection signal RQT indicating the modulation and projection timings of the one-dimensional light modulation elements 5 by using various types of data.

When the scanner motor 3 and the scan mirror 2 are rotating, the angle signal SAS output from the angle sensor 16 causes a phase delay with respect to the actual angle ANG. Due to this, deviation between the outgoing path image and the return path image is caused.

The angle data correction unit 13 corrects the phase delay with respect to the actual angle ANG of the scan mirror 2 regarding the angle signal SAS input from the angle sensor 16, establishes and controls the relationships with the angle of the scan mirror, the projection position on the screen 1, and the modulation timings of the one-dimensional light modulation elements 5a, 5b, and 5c together with the other processing in the system control circuit (SYS-CNT) 10, and matches the projection positions of the outgoing path image and the return path image.

For example, at the stage before producing and shipping out the image display device 19, the phase delay of the angle signal SAS is measured and corrected. For the measurement and the correction, a position sensitive detector (PSD) 15 is provided in front of the screen 1. When the light rays forming the one-dimensional image-emitted from the scan mirror 2 are irradiated to the PSD 15, the PSD 15 outputs two signals PDS-SIG1 and PSD-SIG2 to the left and right of the optical axis relating to the irradiation position of the light rays and inputs them to the light position detection unit 14 in the system control circuit 10.

The light position detection unit 14 finds the irradiation position of the light from the PDS-SIG1 and PSD-SIG2, for example, in accordance with the difference between the PDS-SIG1 and PSD-SIG2 (differential system) like with position detection and defocus detection in an optical disk, estimates the physical position of the scan mirror 2, and compares this with the value of the angle indicated by the angle signal SAS so as to obtain the phase delay of the angle signal SAS.

Figure 7:
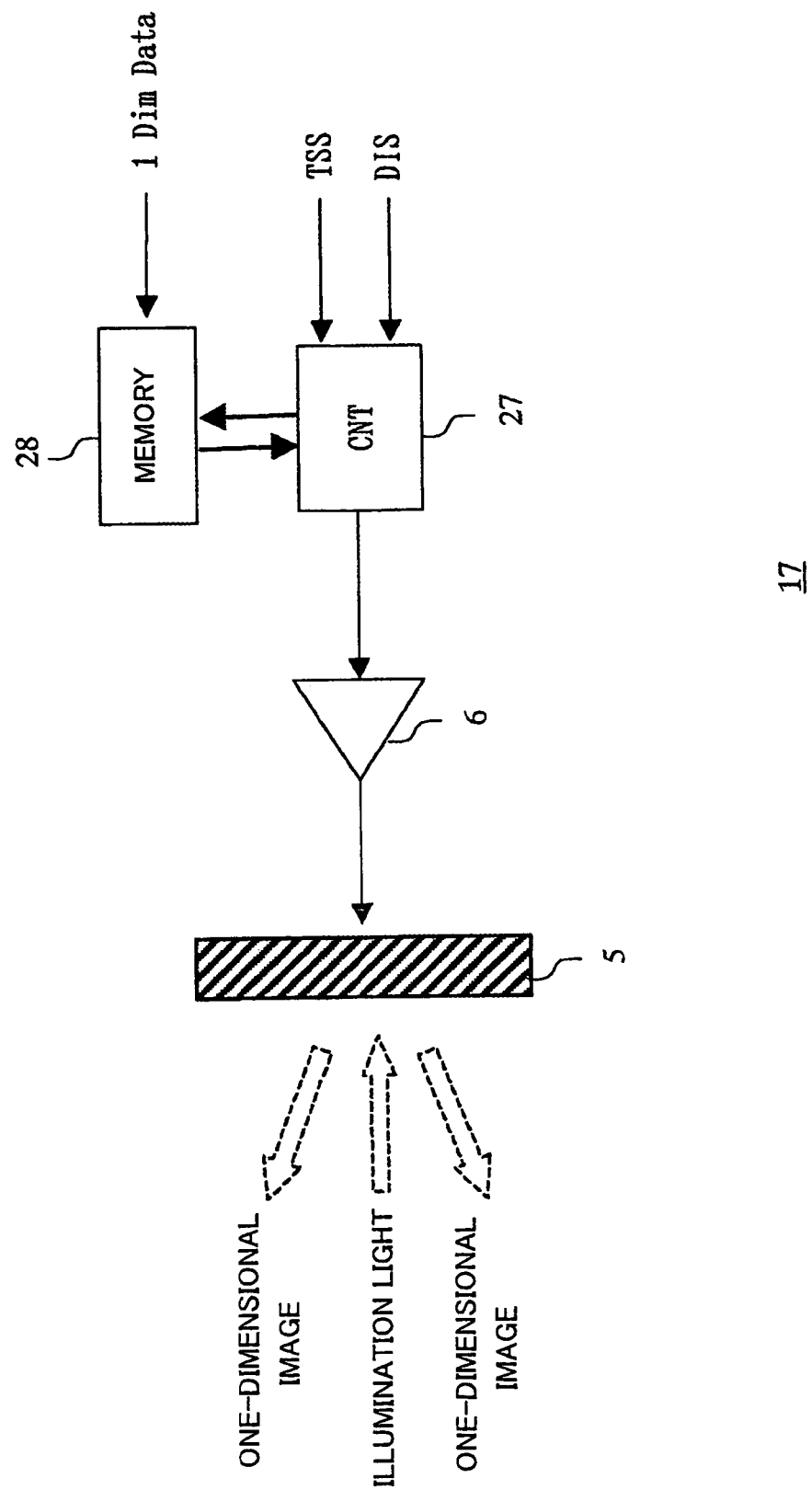
FIG. 7 is a view of an example of the configuration of a one-dimensional modulation element circuit in an image display device according to the embodiment of the present invention illustrated in FIG. 6.

FIG. 7 is a block diagram of an example of the configuration of the one-dimensional light modulation circuits 17a, 17b, and 17c including the one-dimensional light modulation elements 5a, 5b, and 5c and the drive circuits 6a, 6b, and 6c.

Below, for simplification, the parts of the configuration common to the illumination light of the three colors of red (R), green (G), and blue (B) of the one-dimensional light modulation elements 5a, 5b, and 5c, the drive circuits 6a, 6b, and 6c, and the one-dimensional light modulation circuits 17a, 17b, and 17c are referred to as the one-dimensional light modulation elements 5, the drive circuits 6, and the one-dimensional light modulation circuits 17 minus the indexes "a", "b", and "c".

As shown in FIG. 7, each one-dimensional light modulation circuit 17 includes, other than a one-dimensional light modulation element 5 and a drive circuit 6, a memory 28 for storing one line's worth of the drive voltage data and a control circuit 27 for controlling the operation of the drive circuit 6.

The drive voltage data output from the interface circuit 7 of the former stage and displaying a one-dimensional image is input and stored in the memory 28. Further, a transfer start signal TSS for instructing the transfer of the above drive voltage data from the interface circuit 7 and a drive instruction signal DIS for instructing the output of a drive signal to the one-dimensional light modulation element 5 are input from the interface circuit 7 to the control circuit 27.

Figure 8:
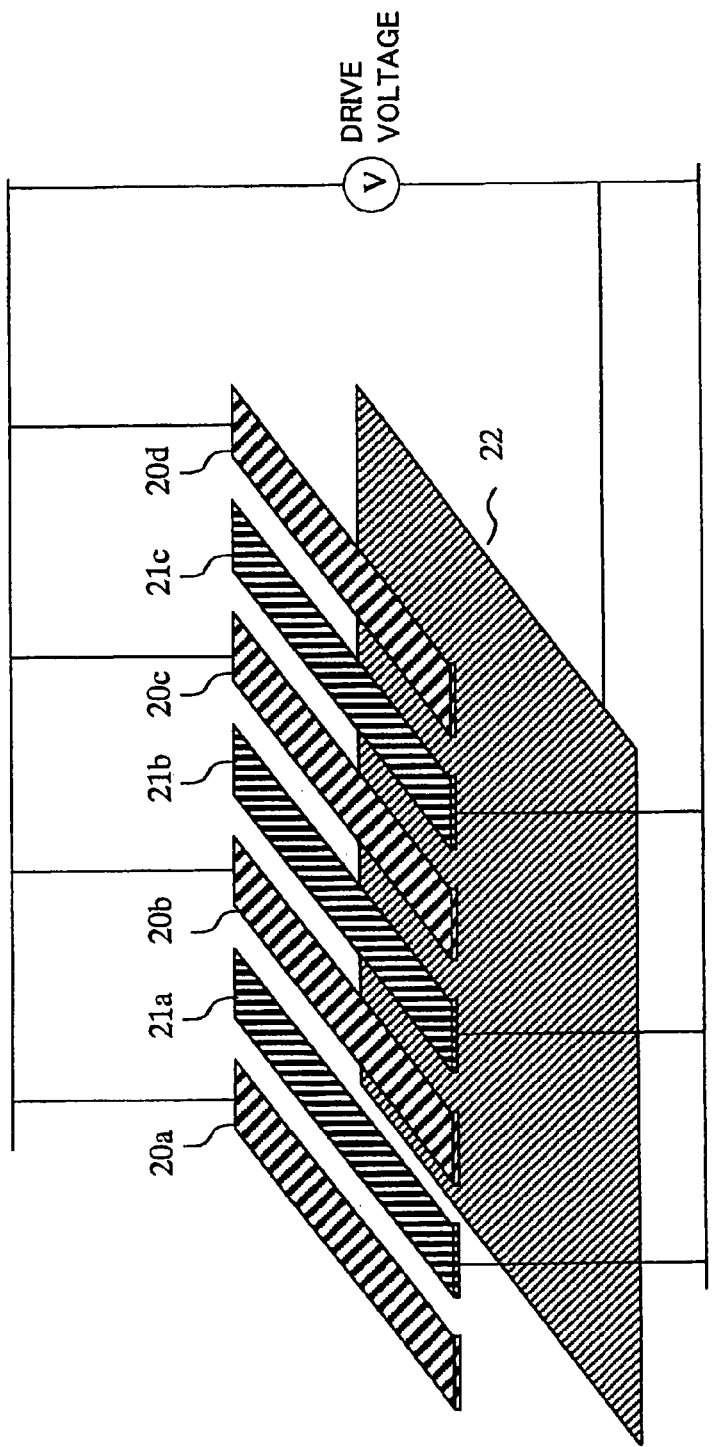
FIG. 8 is a view of the configuration of a one-dimensional modulation element in an image display device according to the embodiment of the present invention illustrated in FIG. 6.

FIG. 8 is a perspective view of the structure of a one-dimensional light modulation element 5.

As shown in FIG. 8, a one-dimensional light modulation element 5 is comprised of a common electrode 22 made of a polycrystalline silicon thin film on a silicon substrate over which, at a predetermined interval from the common electrode 22, strip-shaped ribbon elements 20a, 21a, 20b, 21b, 20c, 21c, and 20d are formed. The elements having the ribbon-like shapes (hereinafter, referred to as the "ribbon elements") 20a, 21a, 20b, 21b, 20c, 21c, and 20d have reflection films (not illustrated) formed on their upper surfaces and act as the reflection members.

Among the ribbon elements 20a, 21a, 20b, 21b, 20c, 21c, and 20d, drive voltages are supplied to the ribbon elements 20a, 20b, 20c, and 20d. Due to the attraction forces or repulsion forces derived from the electrostatic forces in accordance with the drive voltages, the ribbon elements 20a, 20b, 20c, and 20d can move or bend in the vertical direction. On the other hand, the ribbon elements 21a, 21b, and 21c are located at the designated positions and do not move during the operation of the one-dimensional light modulation element 5. The moving or bending ribbon elements 20a, 20b, 20c, and 20d will be referred to as the "moveable ribbon elements", while the ribbon elements 21a, 21b, and 21c which do not move or bend, but are fixed in place will be referred to as the "fixed ribbon elements".

As a typical example of the dimensions of the ribbon elements, for example, the width of the ribbon elements is 3 to 4 μm, the gap between adjacent ribbon elements is about 0.6 μm, and the length of the ribbon elements is about 200 to 4.00 μm.

A plurality of ribbon elements can be used as a set for one pixel. For example, the six adjacent ribbon elements 20a, 21a, 20b, 21b, 20c, and 21c shown in FIG. 8 can be used so as to express one pixel. In this case, one pixel worth of width is about 25 μm.

For example, in a one-dimensional light modulation element displaying 1080 pixels now being put into practical use, 1080 pixels' worth of ribbon elements are arranged along the horizontal direction of FIG. 8.

The operation of a one-dimensional light modulation element 5 is controlled by the voltage supplied between the ribbon elements 20a, 21a, 20b, 21b, 20c, 21c, and 20d and the common electrode 22. When making the drive voltages to the moveable ribbon elements 20a, 20b, and 20c OFF and grounding the fixed ribbon elements 21a, 21b, and 21c (OFF state), the moveable ribbon elements 20a, 20b, and 20c do not move, so all ribbon elements are located on the same plane, act as a flat mirror, and reflect most of the incident illumination light rays without diffracting or deflecting them.

Note that, in actuality, a fine amount of ±2nd order diffraction light, ±4-th order diffraction light, and other even number order diffraction light is also generated.

On the other hand, when supplying the predetermined drive voltages to the moveable ribbon elements 20a, 20b1, and 20c and grounding the fixed ribbon elements 21a, 21b, and 21c (ON state), the moveable ribbon elements 20a, 20b, and 20c are pulled down to the side of the common electrode 22 by the electrostatic force due to the drive voltages and move or bend. For example, the moveable ribbon elements 20a, 20b, and 20c move or bend by $\lambda/4$ (.lambda. is the wavelength of the incident light). As an example, when $\lambda=532$ nm, the amount of movement of the moveable ribbon elements is $\lambda/4=133$ nm at the maximum.

When the illumination light rays are incident in this state, the overall optical path difference between the light rays reflected at the moveable ribbon elements 20a, 20b, and 20c and the light rays reflected at the fixed ribbon elements 21a, 21b, and 21c become a half wavelength (λ/2). Due to this, the one-dimensional light modulation element 5 will act as a reflection type grating lattice, the reflected light rays (0 order light) will interfere with each other and cancel out each other, and thus ±1st order light, ±3rd order light, and other odd number order diffraction light will be generated.

The generated ±1st order light passes through the projection optical system 4 and forms a one-dimensional image on the screen 1. When the scan mirror 2 scans, the one-dimensional image is laid out on the screen 1 and forms a two-dimensional image.

Figure 9:
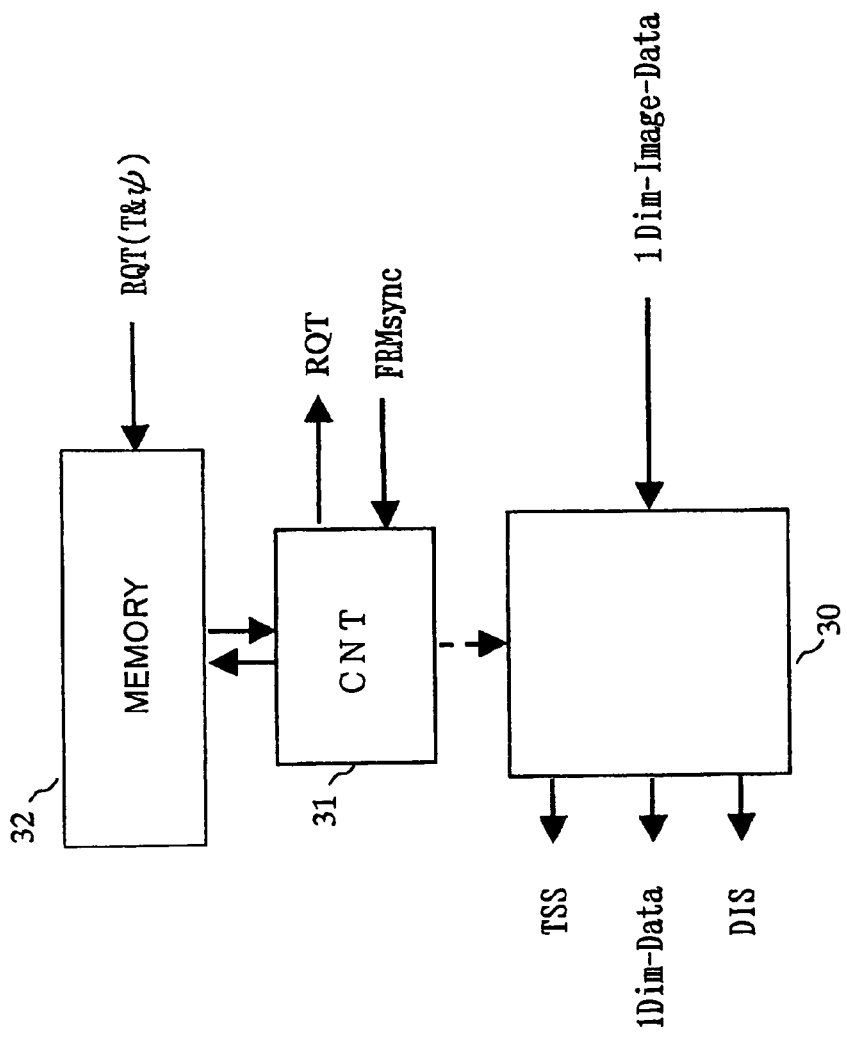
FIG. 9 is a view of an example of the configuration of an interface circuit in an image display device according to the embodiment of the present invention illustrated in FIG. 6.

FIG. 9 is a block diagram of an example of the configuration of the interface circuit 7.

The interface circuit 7 has for example a data format conversion circuit 30, a control circuit CNT 31, and a memory 32.

The data format conversion circuit 30 converts one-dimensional video data 1Dim-Image-Data input from the video data conversion circuit 8 to a drive voltage to be supplied to the moveable ribbons of a predetermined pixel of the one-dimensional light modulation element 5 and outputs it to the memory 28 of the one-dimensional modulation circuit 17 for storage. Further, it stores a one-dimensional image input from the interface circuit 7. The data format conversion circuit 30 outputs to the control circuit 27 of the one-dimensional modulation circuit 17 the transfer start signal TSS instructing the transfer of the drive voltage data and the drive instruction signal-DIS for instructing the drive circuit 6 to operate and output the drive signal to the one-dimensional light modulation element 5.

The memory 32 holds the generation timing of the modulation/projection signal RQT for determining the modulation timing and the phase data (T and ψ) of the one-dimensional modulation element 5.

The control circuit 31 receives the frame synchronization signal FRMsync and adjusts the operation timings of the interface circuit 7 and the configuration components. Further, based on the generation timing and the phase data (T and ψ) of the modulation/projection signal RQT stored in the memory 32, the modulation/projection signal RQT for determining the modulation timing of the one-dimensional light modulation element 5 is generated and output to the video data conversion circuit 8.

Figure 10:
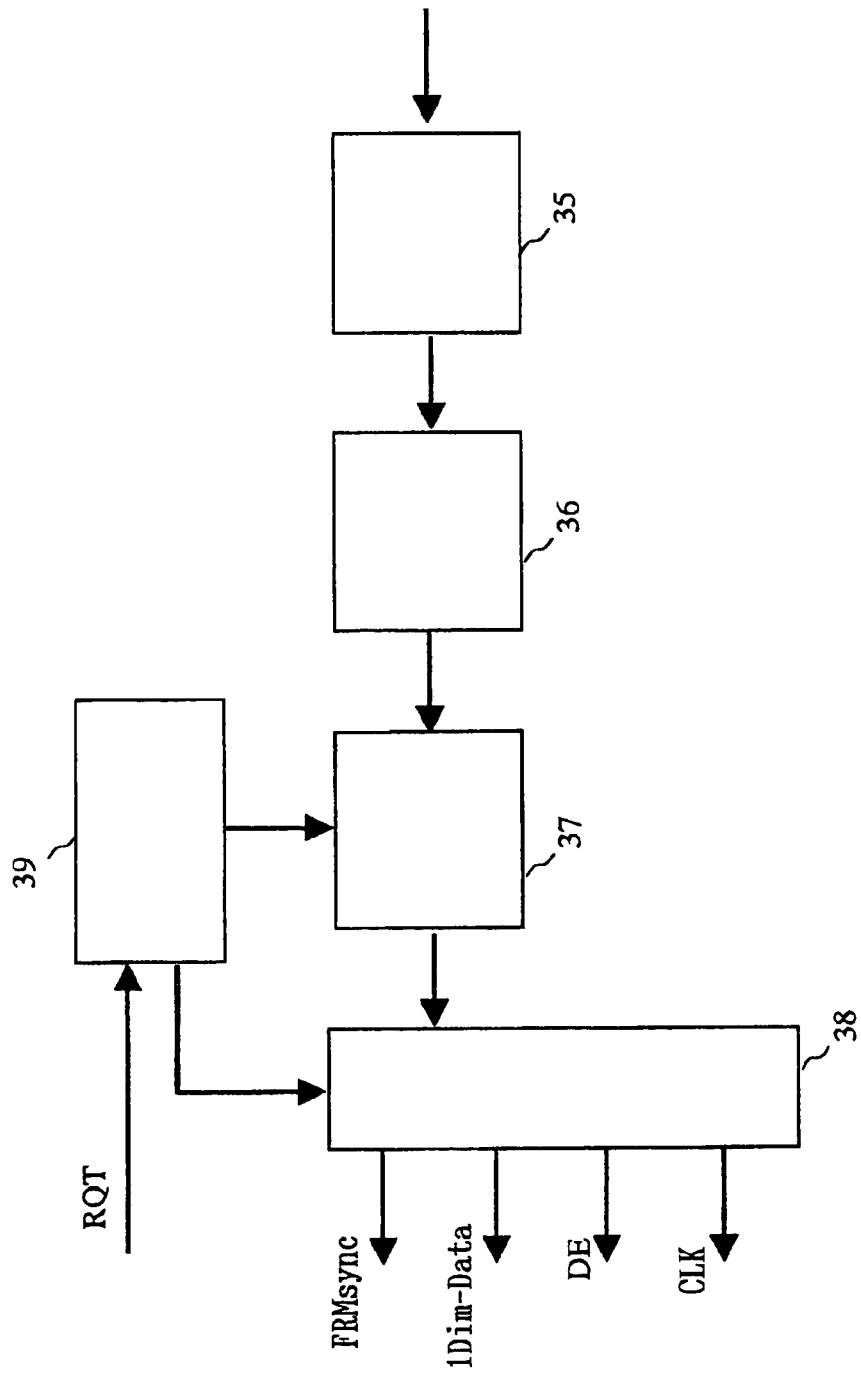
FIG. 10 is a view of an example of the configuration of a data conversion circuit in an image display device according to the embodiment of the present invention illustrated in FIG. 6.

FIG. 10 is a block diagram of an example of the configuration of a video data conversion circuit 8.

A video data conversion circuit 8 has for example an image input circuit 35, an XY conversion circuit 36, a frame memory 37, an image output circuit 38, and a control circuit 39.

Among the video data conversion circuits 8a, 8b, and 8c, for example, the video data conversion circuit 8a generates the frame synchronization signal FRMsync as the reference circuit and outputs it to the system control circuit 10. The data input to the video data conversion circuit 8a includes the frame synchronization signal serving as a reference. The video data conversion circuit 8a converts the timing of the frame synchronization signal to the timing set in the control circuit 39 and outputs it as the frame synchronization signal FRMsync.

For example, a DVD or other video player inputs a progressive color difference signal YCbCr (YPbPr) to the image input circuit 35. The image input circuit 35 converts the color difference signal YCbCr (YPbPr) to an RGB signal and adds a nonlinear characteristic (γ-characteristic) to the RGB signal by inverse gamma correction processing in the image input circuit 35.

The one-dimensional modulation element 5 is used to scan by one-dimensional vertical images to display a two-dimensional image, so differs from the format of the above progressive video data continuously input in time sequence. For this reason, it is necessary to convert the data format of the above progressive video data to a format for a two-dimensional image. The XY conversion circuit 36 performs the vertical/horizontal conversion of the data for one frame's worth of video data and optimally switches the order of the data array to form one-dimensional video data.

The converted frame's worth of video data is stored in the frame memory 37 in unit of lines. Here, according to the rotation direction of the scan mirror 2, the order of the one-dimensional video data supplied to the one-dimensional modulation element 5 as the drive signal becomes inverse, therefore the line units of video data stored in the frame memory 37 are made reverse in order from the one-dimensional video data in advance when for example the scan mirror 2 rotates in the return direction.

The control circuit 39 receives the modulation/projection signal RQT from the interface circuit 7 and outputs the one-frame's worth of video data stored in the frame memory 37 through the image output circuit 38 one line at a time to the interface circuit 7 in synchronization with the modulation/projection signal RQT.

Figure 11:
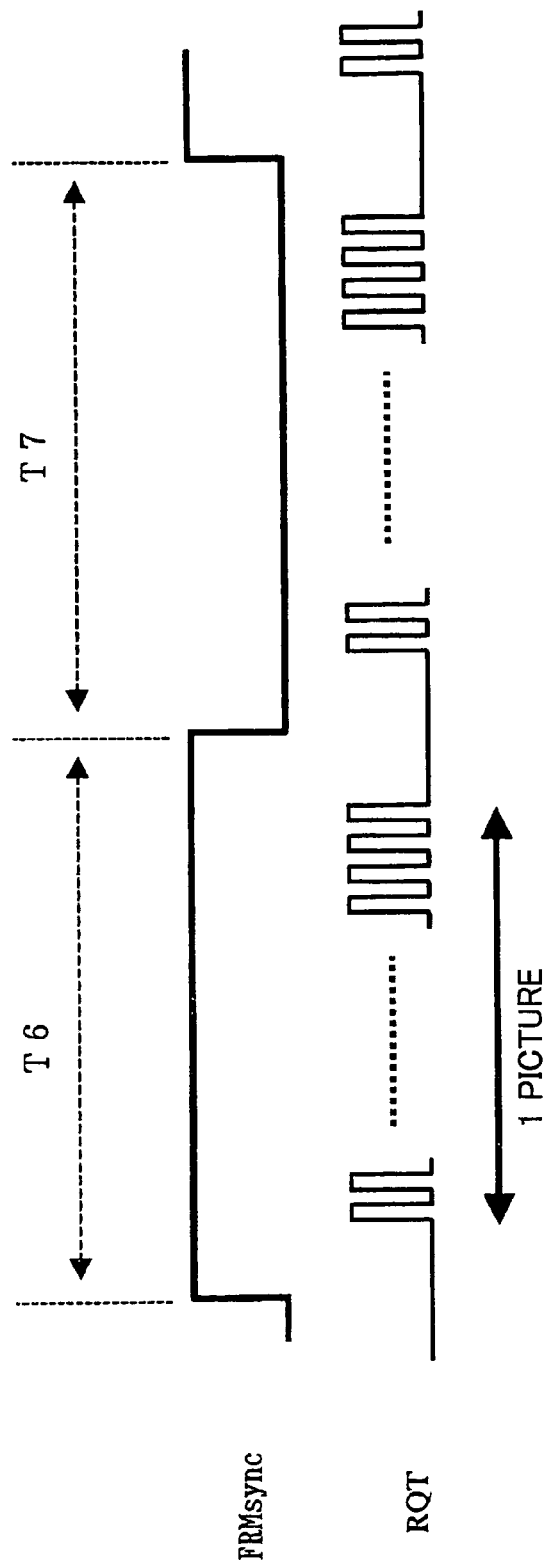
FIG. 11 is a timing chart of a frame synchronization signal and a modulation/projection signal in an image display device according to the embodiment of the present invention illustrated in FIG. 6.

FIG. 11 is a timing chart of the frame synchronization signal FRMsync and the modulation/projection signal RQT output from the video data conversion circuit 8 to the interface circuit 7 for determining the modulation timing of the one-dimensional modulation element 5.

As shown in FIG. 11, in the period T6 or T7 indicated in the frame synchronization signal FRMsync, each frame's worth of the video data is transferred via the video data conversion circuit 8, the interface circuit 7, and the drive circuit 6, converted to drive voltage, and successively supplied to the one-dimensional modulation element 5, whereby one frame is displayed on the screen 1.

In the period T6, for example, the scan mirror 2 rotates in the outgoing path and scans to project the outgoing path image on the screen 1. On the other hand, in the period T7, the scan mirror 2 rotates in the return path and scans and projects the return path image on the screen 1.

In the period T6 or T7, for example, the one-dimensional light modulation element 5 to which 1920 modulation/projection signals RQT for forming one frame comprised of 1920 lines are supplied performs modulation 1920 times.

FIG. 12A to FIG. 12G are timing charts of the signals explained above.

Figure 12:
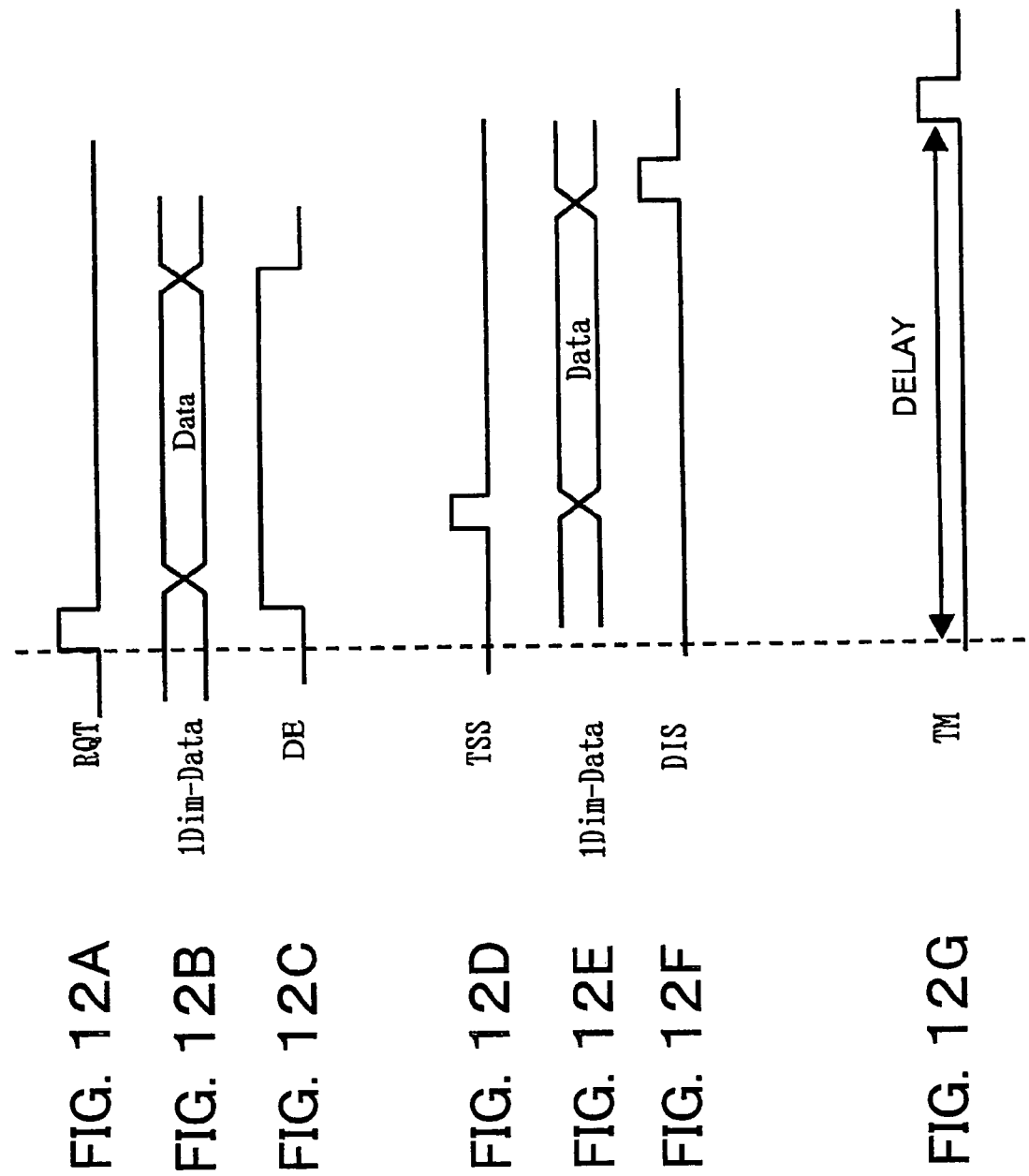
FIG. 12A to FIG. 12G are timing charts of various signals in an image display device according to the embodiment of the present invention illustrated in FIG. 6.

FIG. 12A to FIG. 12C are timing charts of signals in the video data conversion circuit 8.

The video data conversion circuit 8, in synchronization with the modulation/projection signal RQT of FIG. 12A, outputs one line of data in the frame memory 37 shown in FIG. 12B to the interface circuit 7 during the data enable (DE) period shown in FIG. 12C.

FIG. 12D to FIG. 12F are timing charts of the signals in the interface circuit 7.

After the transfer start signal TSS (FIG. 12D) for instructing the output of the converted one-dimensional data to the one-dimensional light modulation circuit 17, the interface circuit 7 outputs the one-dimensional data shown in FIG. 12E, then outputs the drive instruction signal DIS (FIG. 12F) for making the drive circuit 6 operate.

After the drive instruction signal DIS, the one-dimensional modulation element 5 modulates the irradiation light at the timing shown in FIG. 12G.

As shown in FIG. 12A and FIG. 12G, there is a certain time delay between the modulation/projection signal RQT and the modulation timing TM of the one-dimensional modulation element 5.

[Scan System]

The present embodiment is characterized in that y horizontally scanning by the vertical one-dimensional image projected onto the screen 1, it is possible to generate a two-dimensional image and freely change the projection timing of the vertical one-dimensional image by the modulation/projection signal RQT.

Therefore, the match of the positions of the two-dimensional image projected in the outgoing and return paths of the scan mirror 2 is realized by projecting the same one-dimensional image projected in the outgoing and return paths at the timing giving the same position in the outgoing and return paths.

In the present embodiment, the following control is carried out to achieve a match of the positions of the two-dimensional image projected in the outgoing and return paths of the scan mirror 2.

[Scan System: Synchronization between Scan Mirror and Frame Synchronization Signal]

In the present embodiment, the scan system is controlled by the triangular wave to project the image in both of the outgoing and return paths by the image signal.

Figure 13:
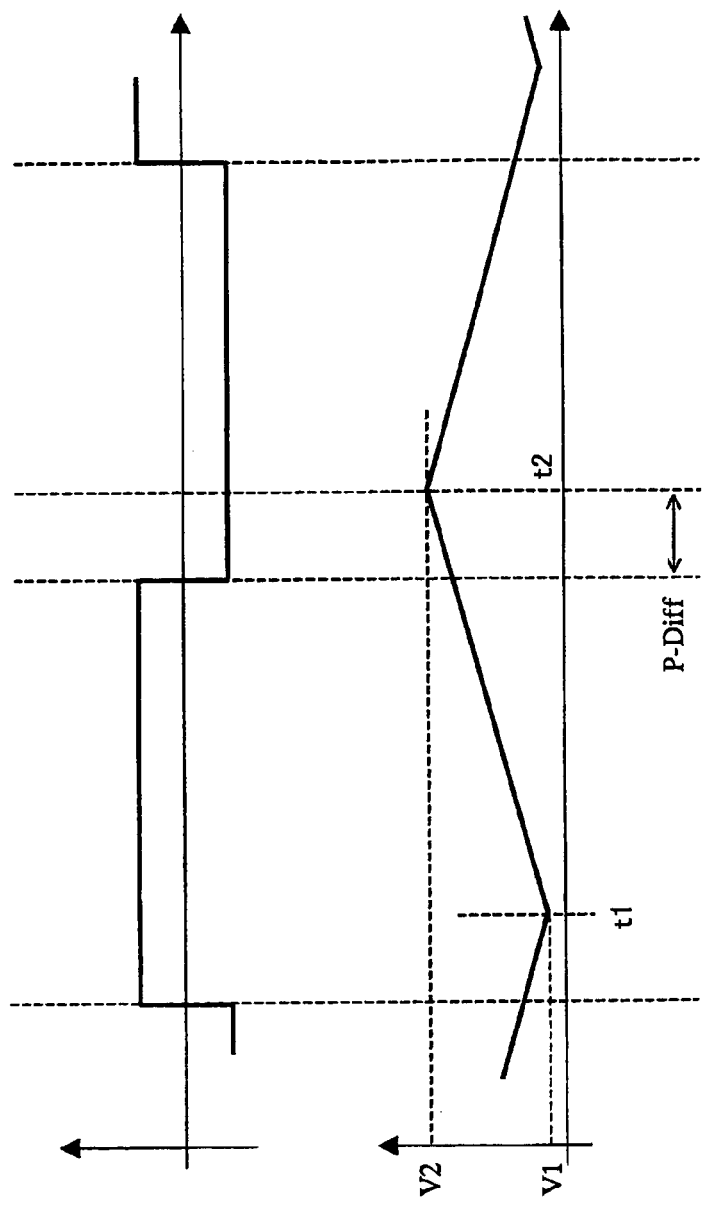
FIG. 13A and FIG. 13B are views for explaining a deviation of a switching timing of a frame synchronization signal and a switching timing of an angle signal in an image display device according to the embodiment of the present invention illustrated in FIG. 6.

FIG. 13A and FIG. 13B are views for comparing the timings of the frame synchronization signal FRMsync (A) and the angle signal SAS (B) output by the angle sensor 16.

As shown in FIG. 13B, at a time t1, the angle signal SAS has the minimum value V1. At this time, it is assumed that the angle of the scan mirror 2 is zero. Due to the triangular scanner drive signal supplied to the scanner motor 3, the scan mirror 2 is accelerated to for example a predetermined rotational speed in the outgoing path direction and rotates at a constant speed in the outgoing path direction, whereby the angle of the scan mirror 2 gradually increases. In accordance with this, the angle signal SAS output by the angle sensor 16 also gradually increases.

At a time t2, the scan mirror 2 reaches the maximum angle in the outgoing path direction, whereupon the angle signal SAS becomes the maximum value V2. At that time, the scan mirror 2 is decelerated, becomes zero in rotational speed, and starts to rotate in the return path direction.

In the region other than the pole change point, the rotational speeds of the scanner motor 3 and the scan mirror 2 become almost constant. Therefore, as shown in FIG. 13B, the angle signal SAS changes along almost a straight line.

As shown in FIG. 13A and FIG. 13B, however, usually, the angle signal SAS is not synchronized with the frame synchronization signal FRMsync, and there is a certain phase difference P-Diff.

In the present embodiment, in order to control the scan system by a triangular wave signal to project the image of the image signal in both of the outgoing and return path directions, one frame's worth of the video data must be output during the period where the scan mirror 2 is rotating in one direction. For this reason, desirably the switching of the frame synchronization timing and the switching timing of the movement direction of the scan mirror 2 coincide. Namely, the phase difference between the direction switching timing of the scan mirror (the pole change point of the angle signal SAS) and the switching timing of the image of the frame synchronization signal FRMsync is made 0.

The above control is carried out as follows.

In the usual state, using the switch signal (one direction) of the image signal as a trigger, the phase difference between the timing when the movement speed of the scan mirror 2 becomes 0 (pole change point) and the switching signal is calculated from the angle signal SAS by using the angle signal SAS of the angle sensor 16. The calculated phase difference is used to change the phase of the scanner instruction signal SIS so that the phase difference becomes 0.

Further, in the reverse phase, control conversion by 180 degrees is performed so that the projection direction of the image becomes constant and the polarity of the potential of the pole change point becomes constant at the trigger timing.

Figure 14:
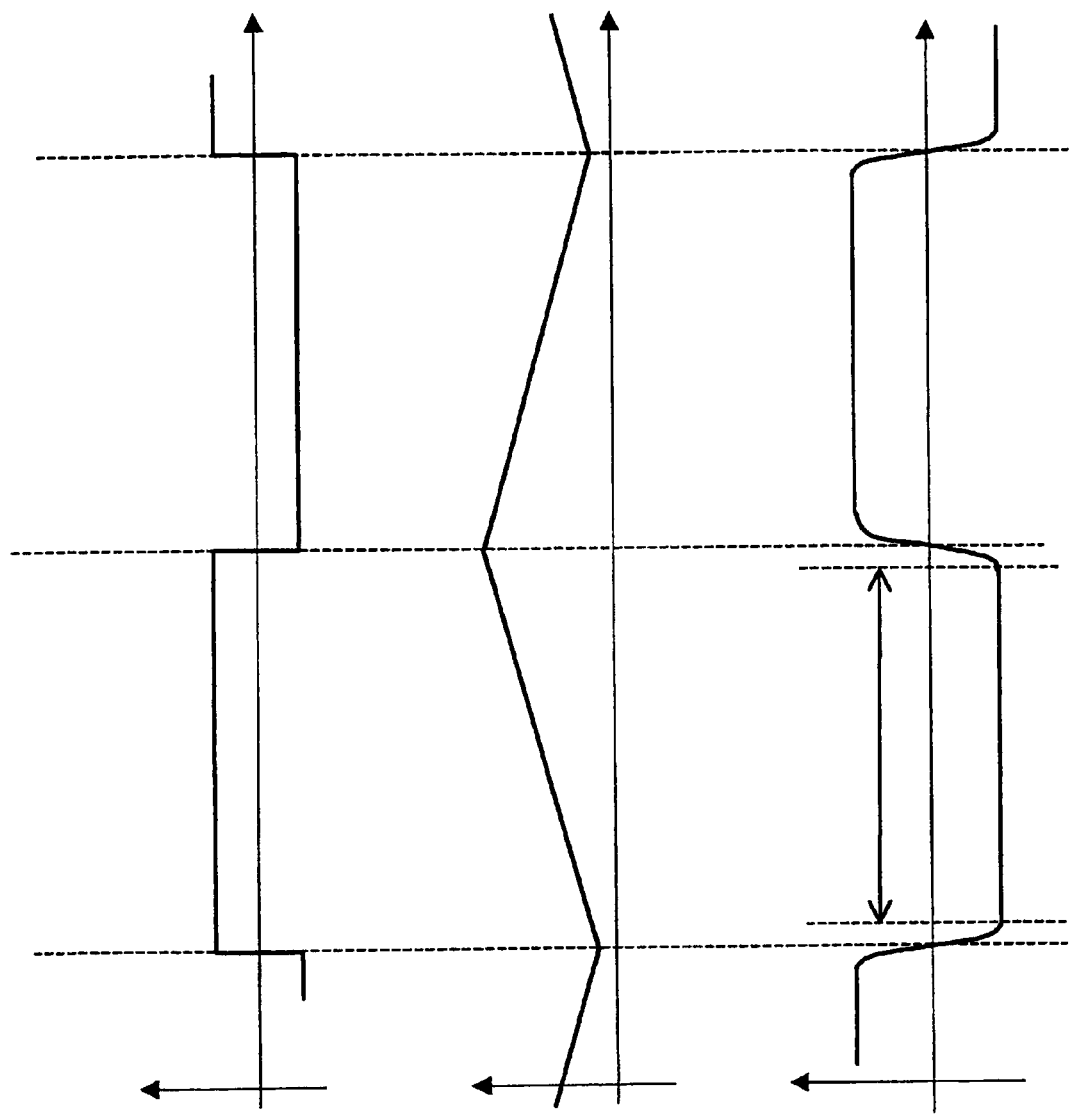
FIG. 14A to FIG. 14C are timing charts of a frame synchronization signal, an angle signal, and a speed signal after correcting the deviation of the switching timing of the frame synchronization signal and the switching timing of the angle signal shown in FIG. 13A and FIG. 13B.

FIG. 14A to FIG. 14C are views for comparing the timings of the frame synchronization signal FRMsync, the angle signal SAS of the angle sensor 16, and the speed signal SPD-SIG indicating the rotational speed of the scan mirror 2 after performing the above adjustment.

As shown in FIG. 14A and FIG. 14B, after adjusting the phase of the scanner instruction signal SIS, the switching timing of the frame synchronization signal FRMsync and the switching timing of the movement direction of the scan mirror 2 match.

Further, in order to facilitate the control of the timing of the video data, the image is projected in a region where the change of speed of the scan mirror 2 is as small as possible.

As shown in FIG. 14C, except for the pole change point, the speed of the scan mirror 2 is substantially stable.

[Scan System: Measurement of Phase Delay of Angle Signal]

As mentioned above, when the scanner motor 3 is rotating, the angle of the scan mirror 2 read from the angle signal output by the angle sensor 16 has a phase delay with respect to the actual angle of the scan mirror 2. In order to realize a match between the outgoing path image and the return path image in the reciprocal scanning, the phase delay of the angle signal must be correctly grasped and adequately corrected.

In order to measure the phase delay of the angle signal, it is necessary to grasp the actual angle of the scan mirror 2 not including the phase delay. Therefore first, a reference value for estimating the actual angle is measured.

[Measurement of Angle and Reference Value of Angle Signal]

As shown in FIG. 6, in front of the screen 1, a position measurement device mounting a position sensitive device (PSD) 15 is disposed to measure the light rays forming the line image projected from the scan mirror 2.

In the state where the scan mirror 2 is stopped, the angle signal of the angle sensor 16 does not include any phase delay. Therefore, in this state, the angle of the scan mirror 2 when the light is projected to the center of the PSD 15 is defined as the reference angle, and the value of the angle signal of the angle sensor 16 is defined as the reference value.

Figure 15:
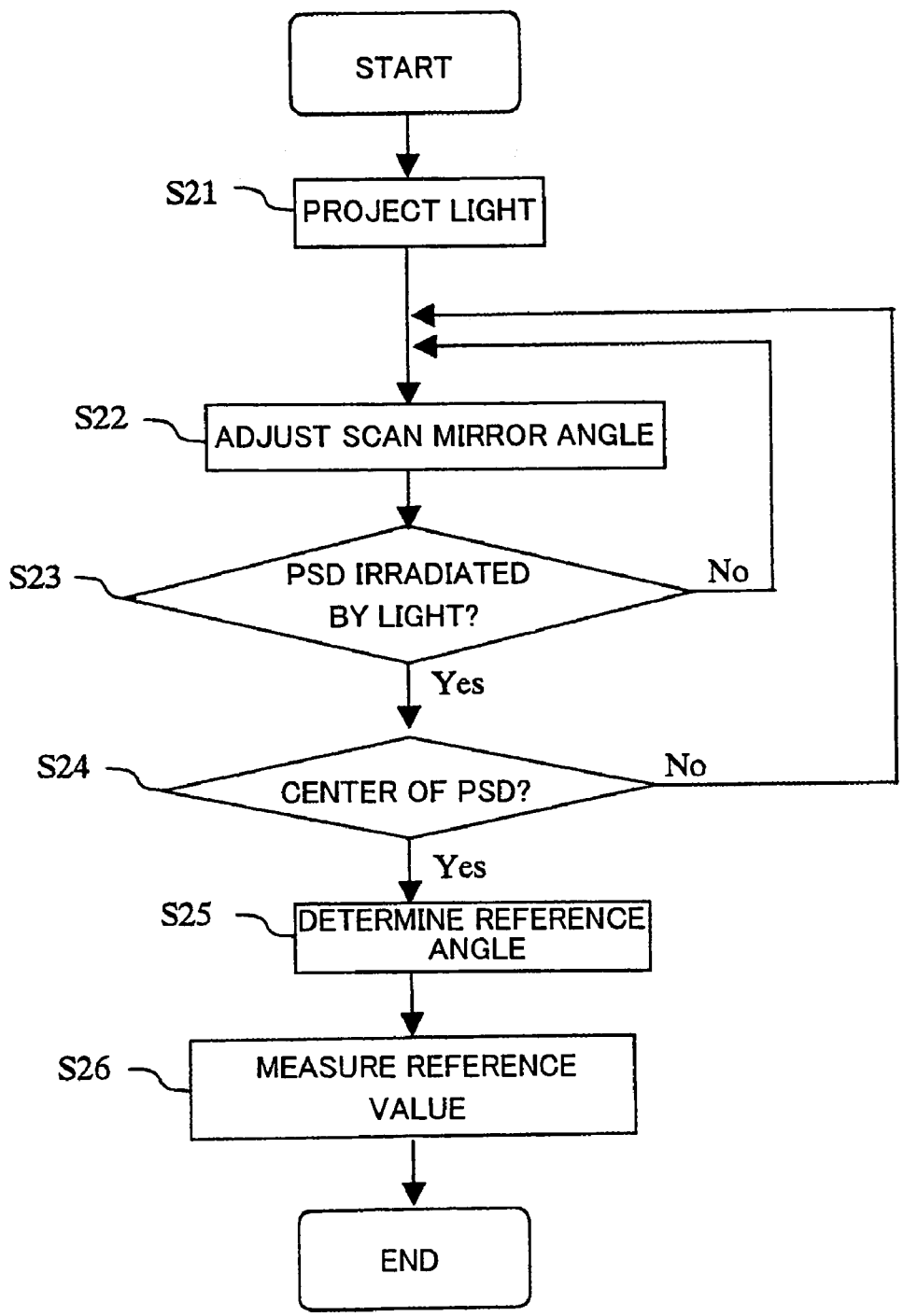
FIG. 15 is a flow chart for explaining a method of measuring a reference angle of the scan mirror and a reference value of the angle signal in a system control circuit of an image display device according to the embodiment of the present invention illustrated in FIG. 6.

FIG. 15 is a flow chart showing a method of measuring the reference angle of the scan mirror 2 and the reference value of the angle signal of the angle sensor 16 by the PSD 15 in the state where the scanner system is stopped. This processing, for example, uses the system control circuit 10. The system control circuit 10 includes a computer 11 or other processing means. The program installed in the computer 11 or other processing means performs the following processing:

Step 21:

The system control circuit supplies any drive voltage to the one-dimensional modulation element 5, modulates the irradiation light, and emits the emitted light rays to the scan mirror 2. The light rays are projected onto the screen 1 by the scan mirror 2.

Step 22:

The system control circuit changes the angle of the scan mirror 2 and adjusts the projection position so that the light rays from the scan mirror 2 are projected to the PSD 15 arranged at a predetermined position in front of the screen 1.

Figure 1:
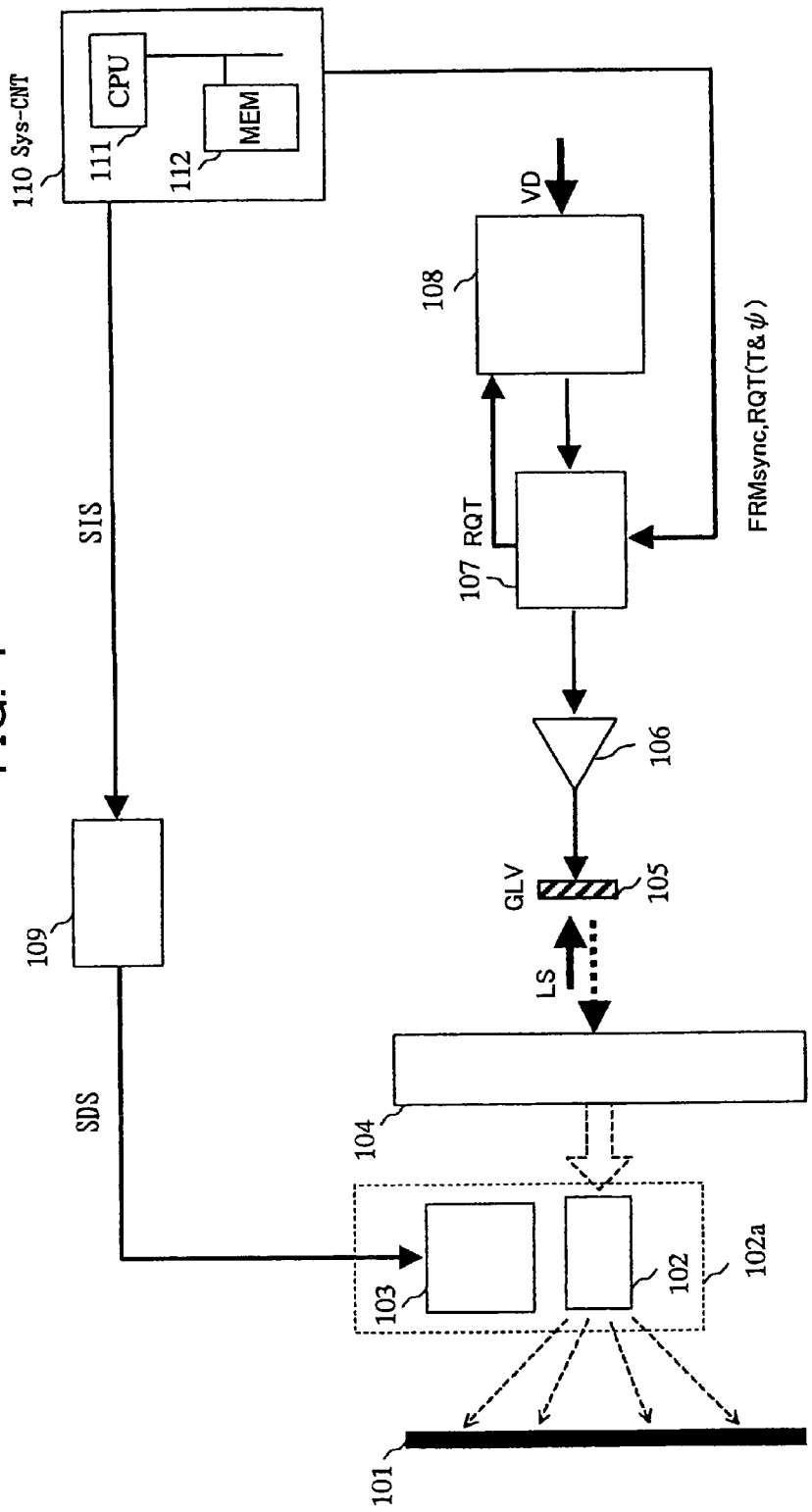
FIG. 1 is a view of an example of the configuration of an image display device using a one-dimensional light modulation element.

FIG. 16A1 to FIG. 16C1 show the above processing steps.

FIG. 16A1 to FIG. 16C3 are views showing steps of measuring the reference angle of the scan mirror 2 and the reference value of the angle signal of the angle sensor 16 by the PSD 15 in the state where the scanner system is stopped.

As shown in FIG. 16A1 to FIG. 16C1, the PSD 15 is disposed in front of the screen 1. For example, both the left and right ends of the PSD 15 output two signals PSD-SIG1 and PSD-SIG2 concerning the detected projection position of the light rays.

By successively changing the angle of the scan mirror 2 by the system control circuit, the projection light 40 moves on the screen 1.

Step 23:

When the signals PSD-SIG1 and PSD-SIG2 output from the PSD 15 include only noise, that is, where the light rays forming the projection light 40 do not strike the PSD 15, the system control circuit returns to the processing of step 22 and continues to adjust the angle of the scan mirror 2.

When the PSD-SIG1 and the PSD-SIG2 are sufficiently larger than the noise, the projection light 40 irradiates the PSD 15, so the processing of the system control circuit proceeds to the next step.

Step 24:

From the signals PSD-SIG1 and PSD-SIG 2 output from the PSD 15, the system control circuit computes an addition signal obtained by adding the PSD-SIG 1 and the PSD-SIG 2 and a subtraction signal obtained by subtracting them from each other.

Figure 2B:
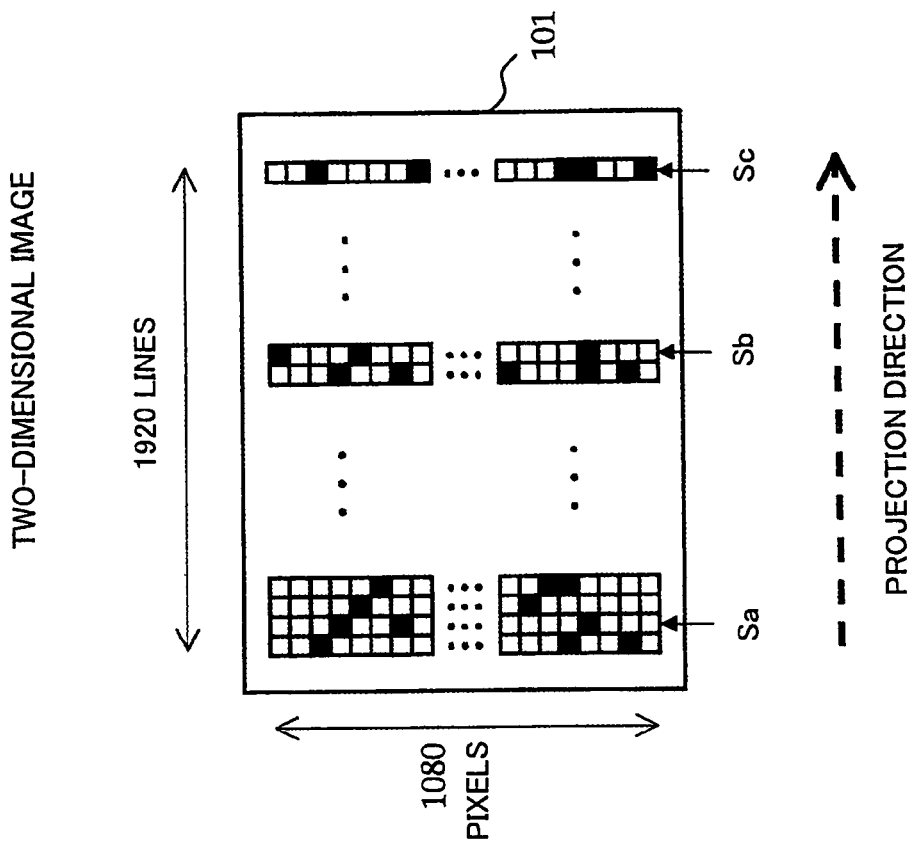
FIG. 2A and FIG. 2B are views for explaining a principle of forming a two-dimensional image by a scan mirror in the image display device illustrated in FIG. 1.
Figure 2A:
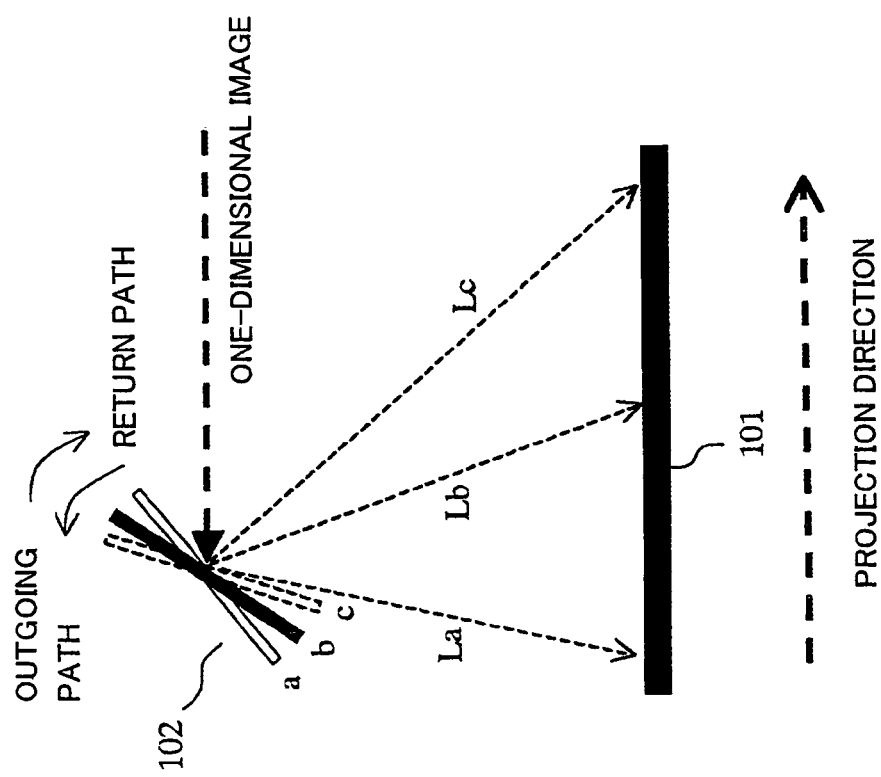

FIG. 16A2 to FIG. 16C2 show the subtraction signals and the addition signals corresponding to the positions of the projection light 40 shown in FIG. 16A1 to FIG. 16C1.

From the characteristic of the PSD 15, the position of the projection light 40 is proportional to the ratio of the subtraction signal and the addition signal. Particularly, as shown in FIG. 16B2, the position where the ratio of the subtraction signal and the addition signal becomes zero is the center of the PSD 15.

When the projection position of the projection light 40 is not the center of the PSD 15, the system control circuit returns to step 22 and continues to adjust the angle of the scan mirror 2.

When the projection position of the projection light 40 is the center of the PSD 15, the processing proceeds to step 25.

Step 25:

Since the projection position of the projection light 40 is the center of the PSD 15, the system control circuit defines the angle of the scan mirror 2 at this time as the reference angle.

Step 26:

At the reference angle of the scan mirror 2, the system control circuit measures the value of the angle signal output by the angle sensor 16 and defines that value as the reference value (without phase delay) of the angle signal.

By the above measurement of the system control circuit, a one-to-one relationship between the actual angle of the scan mirror 2 and the value of the angle signal output by the angle sensor 16 is established.

[Measurement of Phase Delay of Angle Signal]

If the angle of the scan mirror 2 when projecting the light onto the screen 1 can be correctly grasped, the position of the light on the screen 1 can be decided. By controlling the projection timing thereof, the image can be output to the desired position. Even in the case where the same image is projected in the outgoing and return directions, it becomes possible to superimpose images on each other.

However, the angle signal actually output from the angle sensor 16 has a certain phase delay with respect to the actual angle due to the characteristic of the angle sensor 16, the error of the output circuit system, etc. The angle of the scan mirror 2 at the projection timing is not the rotation angle matching with the modulated video data, so an image cannot be output to the desired position. In order to correctly grasp the relationship between the projection timing and the angle of the scan mirror 2, it is necessary to detect the amount of phase delay of the angle signal and correct it.

Next, an explanation will be given of the method of measuring and correcting the amount of phase delay of the angle signal.

In order to measure the phase delay of the angle signal, in the same way as the time illustrated in FIG. 16, the PSD 15 is disposed in front of the screen 1, light rays for forming the line image are projected from the scan mirror 2 to the PSD 15, and the projection position thereof is measured. Note that when measuring the phase delay of the angle signal of the angle sensor 16, the scan mirror 2 is rotating.

FIG. 17 is a flow chart showing the method of measuring the phase delay of the angle signal output by the angle sensor 16.

Step 31:

Video data including only one line in one frame is prepared. Based on the video data, drive voltage is supplied to the one-dimensional modulation element 5, the irradiation light from the light source is modulated, and the light rays forming the line image are emitted to the scan mirror 2. The light rays are scanned by the scan mirror 2 and projected onto the screen 1.

Step 32:

To project the projection light rays 40 to the PSD 15 disposed in front of the screen 1, the system control circuit 10 adjusts the timings of the modulation of the one-dimensional modulation element 5 and the modulation/projection signal RQT for determining the projection timing in units of lines.

In the measurement of the angle and the reference value of the angle signal, the angle of the scan mirror 2 was already adjusted so that the projection light 40 was irradiated to the center of the PSD 15 (that is, the reference angle), therefore, here, ideally, if the angle of the scan mirror 2 is set at the reference angle, the projection light must be irradiated to the center of the PSD 15. In actuality, however, when the scanner motor 3 and the scan-mirror 2 rotate, a phase delay is generated in the angle signal with respect to the actual angle of the scan mirror 2. Therefore, even if the value of the angle signal becomes the reference value, the angle of the scan mirror 2 does not become the reference angle and the projection light 40 is not formed at the center of the PSD 15.

FIG. 18A to FIG. 18D show the processing for adjusting the position of a line image 41 on the screen 1 by adjusting the timing of the modulation/projection signal RQT.

As shown in FIG. 18A, the PSD 15 is disposed in front of the screen. For example, both the left and right ends of the PSD 15 output two signals PSD-SIG1 and PSD-SIG2 concerning the detected projection position of the light rays. The light projected to the screen 1 forms the line image 41.

FIG. 18B shows the frame synchronization signal FRMsync. In the two indicated periods, light is projected in the outgoing path and the return path. As an example, FIG. 18A shows the projection direction at the upper end of the screen 1. In FIG. 18A, the projection direction from the left to right is defined as the outgoing path direction, and the projection direction from the right to left is defined as the return path direction.

FIG. 18C shows the modulation/projection signal RQT1 not corrected in timing. In FIG. 18C, the time t1 is the projection start timing at the outgoing path. At the time t1, the light is projected to the left end portion of the screen 1. At the time t2, the line image 41 used for the measurement is projected. The projection position is for example the left end portion of the PSD 15.

On the other hand, the time t3 is the projection start timing is the time t3 at the return path. The light is projected to the right end portion of the screen 1. At the time t4, the line image 41 is projected. The projection position is for example the right end portion of the PSD 15.

The system control circuit 10 adjusts the projection start timing t1 or t3 and changes the projection timing t2 (case of the outgoing path) or t4 (case of the return path) of the line image 41 to thereby move the line image 41 on the screen 1, adjust the position, and find the projection timing for irradiating the beam to the center of the PSD 15.

In the above adjustment of the timing in the system control circuit 10, the interval (cycle) of the modulation/projection signal is made constant and is not changed.

Step 33:

When the signals PSD-SIG 1 and PSD-SIG2 output from the PSD 15 include only noise, that is, where the light rays forming the line image 41 do not strike the PSD 15, the system control circuit 10 returns to step 32 and continues to adjust the projection timing t2 or t4 of the line image 41.

When the PSD-SIG1 and the PSD-SIG2 are sufficiently larger than the noise, the light rays forming the line image 41 are irradiated to the PSD 15, so the system control circuit 10 proceeds to the next step.

Step 34:

The system control circuit 10 computes the addition signal obtained by adding the PSD-SIG1 and the PSD-SIG2 and the subtraction signal obtained by subtracting them from the signals PSD-SIG1 and PSD-SIG2 output from the PSD 15.

FIG. 19A2 to FIG. 19C2 and FIG. 19A3 to FIG. 19C3 show subtraction signals and addition signals corresponding to the positions of the line image 41 shown in FIG. 19A1 to FIG. 19C1.

The line image 41 moves, therefore, as shown in FIG. 19A2 to FIG. 19C2, the value of the subtraction signal does not become constant. In this case, the system control circuit 10 performs the calculation by the ratio by using the maximum value (Vmax) and the minimum value (Vmin) of the addition signals (Vadd) and the subtraction signals for the projection position on the PSD 15. Namely, Projection position $PX = (Vmax + Vmin)/Vadd$ By the above calculation, the projection position PX at the PSD 15 is decided. Particularly, at the center of the PSD 15, the projection position PX becomes zero.

When the projection position of the projection light of the line image 41 is not the center of the PSD 15, the system control circuit 10 returns to step 32 and continues to adjust the angle of the scan mirror 2.

When the projection position of the projection light of the line image 41 is the center of the PSD 15, the system control circuit 10 proceeds to step 35.

Step 35:

Since the center of the line image 41 is at the center of the PSD 15, the projection start timing at that time is the correct projection start timing for forming the line image 41 at the center of the PSD 15 (considering the time delay by the signal transfer).

FIG. 18D shows the modulation/projection signal RQT2 adjusted in this way. In FIG. 18D, the projection start timing is changed to t5 or t7, the projection timing of the line image 41 has become t6 or t8, and the line image 41 is formed at the center of the PSD 15.

Step 36:

The system control circuit 10 compares the angle reference value measured when the scan mirror 2 is stopped and the value of the angle signal output by the angle sensor 16 at the projection timing obtained in the above step 35 and computes and finds the phase delay of the angle signal from the difference between the reference value and the value of the angle signal.

FIG. 20 shows the method of computing the phase delay of the angle signal.

FIG. 20A shows the frame synchronization signal FRMsync. In FIG. 20B, the solid line indicates the angle signal SAS output by the angle sensor 16, and the broken line indicates the actual angle ANG of the scan mirror 2. The white circles are reference values Ref of the angle signal SAS corresponding to the reference angles measured in the outgoing path and the return path t1 and t2 show the projection timings when the line image 41 is focused at the center of the PSD 15. The black circles indicate the values of the angle signal SAS read at the timings t1 and t2, that is, at the time when the line image 41 is focused at the center of the PSD 15. As shown in FIG. 20B, there is a phase delay. Therefore, the value of the angle signal SAS of the angle sensor 16 is different from the actual angle ANG (reference value Ref of the angle). The times until the value of the angle signal SAS becomes the reference values Ref of the angle signal corresponding to the actual angle ANG (reference value Ref of the angle) are phase delays "delay 1" and "delay 2" of the angle signal SAS.

In this way, the phase delay of the angle signal SAS is found.

Step 37:

The above processing is carried out in both directions of the outgoing path and the return path.

[Match of Outgoing Path Image and Return Path Image]

The actual angle ANG for determining the timing RQT of the projection is estimated by preparing angle data, found by correcting the amount of phase delay obtained as described above in one frame's worth of the angle signal SAS measured in advance for the timing of the FRMsync, as a Look-up table in the memory 12 in the system control circuit 10 and calculating from this Look-up table and the time with respect to the timing of the FRMsync of the actual projection time.

FIG. 21 is a view for explaining a method of preparing a Look-up table by correcting the amount of phase delay for one frame's worth of the angle signal SAS for the timing of FRMsync. Here, an example of a Look-up table when the angle signal SAS is acquired at every 1 μs while setting the cycle of one frame to 8333 μs is shown. The Look-up table in the memory 12 is a table comprised by 1 row and 8334 columns wherein the timing of the FRMsync is set at 0 μs and the angle data with respect to each time at every 1 μs from 0 Ps to 8333 μs is recorded. The amount of the phase delay is corrected by replacing the angle data at each time by the angle data at the time after a time in accordance with the amount of phase delay elapses. For example, when the amount of phase delay is 3 μs, as shown in FIG. 21, the data is replaced by the angle data at the time after 3 μs elapses. Further, when the amount of phase delay is for example 1.5 μs, the angle data at the time after 1.5 μs elapses is calculated by interpolation from the angle data at the time before or after that time in the table, then the same correction is carried out.

Note that the Look-up table shown here is one embodiment. Needless to say any table can be used so far as it is a table wherein a one-to-one relationship (correspondence) between the time and the angle data is shown. Further, the amount of phase delay can be corrected by forming a table comprised by 2 rows and 8334 columns and recording the value of the time simultaneously with the angle data, whereby the angle data can be corrected by subtracting the time corresponding to the phase delay with respect to the time.

The content of this Look-up table is found for both of the outgoing path and the return path.

Further, the content of such a Look-up table is desirably prepared in principle immediately before the projection for every image by acquiring the angle signal SAS simultaneously with the projection of one image immediately before that. However, such control becomes troublesome. In addition, it is not necessary to prepare content for every image from the viewpoint of the control precision required in practical use. Therefore, it is also possible for example to prepare the above Look-up table for every 20 images, store this in the memory 12, and use the same Look-up table for 20 images immediately after the preparation of the Look-up table.

By using the Look-up table of the outgoing and returning angle signals corrected as described above, the system control circuit 10 calculates and estimates the actual angle ANG and controls the projection timing RQT with respect to the timing of the FRMsync, whereby it becomes possible to project the entire outgoing and returning image regions at the proper positions.

FIG. 22A to FIG. 22D explain that control method.

FIG. 22A shows a state where a line image 42 must be formed on the screen 1, but a line image 43 is formed in the case where no correction control is applied.

FIG. 22B is a view of the timing of the modulation/projection signal RQT3 at this time. It is assumed that the scan mirror 2 ideally reciprocally rotates, the timing of the RQT3 is set, and the line image 43 is projected at the time t2.

FIG. 22C shows the actual angle ANG with respect to the timing of the FRMsync calculated and estimated by using the data of the Look-up table. As shown in FIG. 22C, the value "a" of the angle data corresponding to the line image 42 and the timing of the modulation/projection signal RQT3 do not match.

In FIG. 22D, the system control circuit 10 generating the signal at the value "a" of the angle data based on the estimated actual angle ANG to therefore change the timing of the modulation/projection signal RQT3 and change the projection timing from t2 to t1. This changed modulation/projection signal is described as RQT4. When projecting the image at the timing of the modulation/projection signal RQT4, the line image 42 is correctly formed.

Such correction processing is carried out in the Sys-CNT 10 at both of the outgoing path and the return path for each line of each image.

As described above, by calculating and estimating the actual angle ANG by using the Look-up table where the outgoing and returning angle signals are corrected and controlling the projection timing RQT with respect to the timing of the FRMsync by using this estimated actual angle ANG, it becomes possible to project the entire outgoing and returning image regions at their proper positions and match the outgoing path image and the return path image.

Note that, for simplifying the above control, for example, it is also possible to match the images of the entire frame region by defining 16 lines as one block, changing the interval (cycle) for every block, and controlling the image output timing with respect to all reference line data.

Depending on the characteristics of the scan system, the proportional relationship (V/deg) between the rotation angle of the scan mirror 2 and the value of the voltage of the angle signal will sometimes differ between the outgoing and return paths. Due to this, error arises between the angle signal and the actual angle.

The system control circuit 10 corrects this error by using the angle signal in which the above phase delay's worth of data is replaced to project a line image in the horizontal direction (scanning direction) of any length in the outgoing and return paths and controlling the image projection timing so that the lengths of the outgoing and returning images in the horizontal direction become the same. Due to this, the difference of the proportional relationship (V/deg) between the rotation angle and the value of the voltage of the angle signal in the outgoing and return paths can be eliminated.

According to the present embodiment, the projection error of the outgoing and return light in the outgoing and return scans occurring in an image display device using a one-dimensional modulation element can be reduced. Due to this, reciprocal scanning (triangular wave scanning) can be realized, and it becomes possible to improve the light projection efficiency.

By controlling the scanning device by a triangular wave signal, the degree of acceleration required for the scan mirror may be made smaller in comparison with a saw-tooth wave, so power saving becomes possible and size reduction/cost reduction can be realized. Further, in comparison with a saw-tooth wave, the degree of the acceleration required for the scan mirror is small and the power applied to the mirror is small, therefore greater compactness of the mirror, reduction of weight, and reduction of cost become possible. Further, the degree of acceleration required for the scanner is small and the speed is slow in comparison with a saw-tooth wave, so the silencing of the sound generated from the mirror becomes possible.

When performing the measurement and control of the present embodiment, for example, by measuring the phase delay by a phase detector at the stage of shipment of the display device and storing the parameter thereof in the system, positioning of the image can be realized.

While the present invention was explained above based on preferred embodiments, the present invention is not limited to the embodiments explained above. Various modifications are possible within a range not out of the gist of the present invention.

In the above embodiments of the present invention, the case of horizontal scanning by a vertical one-dimensional image projected on a screen so as to generate a two-dimensional image was taken as an example, but the present invention can also be applied to a system of vertical scanning by a horizontal one-dimensional image.

In the above embodiments of the present invention, a position sensitive detector (PSD) was used as the position sensor for the positioning, but the same effects are obtained even if various types of position sensitive detectors other than a PSD or detectors using a CCD are used.

The image display device explained in the present invention is an example. Various modifications of the configuration thereof are possible. For example, the image displaying means thereof is not limited to a screen. A photo-sensitive drum of a printer can be used too. That is, the present invention can also be applied to a printer.

Further, in the image display device explained in the present invention, one pixel of a GLV composing the one-dimensional light modulation element includes six ribbon elements, but the present invention is not limited to this.

According to the present invention, by performing reciprocal scanning, the projection error of the outgoing and return light generated in the image display device using the one-dimensional modulation element can be reduced. Due to this, reciprocal scanning is realized, and a high light projection efficiency can be easily realized.

Further, since an image can be output in both of the outgoing and return paths, an image can be output at a frequency of several times the scan system drive frequency, so flicker can be reduced.

Speed unevenness (variation), sensor characteristic error, etc. of the scan system can be absorbed/corrected. Therefore, it is not necessary to use special control as the control of the scanner driver. It becomes possible to use a general purpose scanner system and a simple scanner system, so a greater compactness and reduction of cost can be realized.

Further, due to the reciprocal scanning, a reduction of the power consumption of the scan system, greater compactness, reduction of cost, and greater quietness can be realized.

Further, due to the reciprocal scanning, a 120 Hz projection frame rate can be realized. Therefore, it becomes possible to project an image of a movie format of 24 Hz and a signal of a broadcast format of 60 Hz with the same projection rate without causing image deterioration due to frame skipping etc.

The invention claimed is:

1. An optical scanning device for deflecting incident light modulated in accordance with video data and scanning by the incident light over a scanned surface to form an image, said optical scanning device comprising:
   a scanning means which is rotated in a forward rotation direction and a reverse rotation direction and for deflecting said incident light in accordance with the forward rotation and the reverse rotation; and
   a correcting means for matching the position of the image formed by scanning by said incident light deflected in accordance with said forward rotation on said scanned surface and the position of the image formed by scanning by said incident light deflected in accordance with said reverse rotation on said scanned surface,
   wherein said correcting means comprises:
   an angle detecting means for detecting a rotation angle of said scanning means,
   an angle data storing means for storing a predetermined one frame's worth of angle data in a memory at each time, with respect to a reference signal instructing said rotation, detected by said angle detecting means, and
   a modulation controlling means for calculating a time with respect to said reference signal where said scanning means becomes a predetermined angle from said stored predetermined one frame's worth of angle data at each time and outputs a modulation instruction in accordance with said video data at the time where said predetermined angle is reached,
   wherein said correcting means further comprises:
   a phase delay storing means for storing an amount of delay of phase required until obtaining angle data from said angle detecting means, and
   a correcting means for replacing one frame's worth of angle data of each time detected by said angle detecting means with said one frame's worth of angle data of a time after a time in accordance with said amount of phase delay has elapsed; and
   wherein said correcting means further comprises:
   a light position measuring means, arranged detachably in a predetermined direction corresponding to a predetermined rotation angle of said scanning means, for detecting light rays deflected by said scanning means,
   a first angle measuring means for setting an angle so that light rays deflected by said scanning means strike said light position measuring means and measuring first angle data detected by said angle detecting means of said scanning means at a stop,
   a second angle measuring means for measuring second angle data detected by said angle detecting means of said scanning means when light rays deflected by said scanning means during rotation strike said light position measuring means, and
   a calculating means for comparing said first angle data and said second angle data and calculating an amount of delay of said phase.

2. An optical scanning device as set forth in claim 1, wherein
   said angle data storing means stores one frame's worth of angle data in said forward rotation direction and one frame's worth of angle data in said reverse rotation direction in the memory.

3. A method of correcting a position of an image formed on a scanned surface by an incident light deflected by the optical scanning device according to claim 1, comprising the correction step of:
   matching the position of the image formed by scanning by said incident light deflected in accordance with said forward rotation on said scanned surface and the position of the image formed by scanning by said incident light deflected in accordance with said reverse rotation on said scanned surface.

4. An image display device comprising:
   a light illuminating means;
   a light modulation element for modulating incident light from said illuminating means in accordance with input video data and emitting image-forming light for forming a one-dimensional image;
   a scanning means which is rotated in a forward rotation direction and a reverse rotation direction in accordance with said video data and for deflecting said image-forming light;
   a correcting means for matching the position of an image formed by scanning by said image-forming light deflected in accordance with said forward rotation on said scanned surface and the position of an image formed by scanning by said image-forming light deflected in accordance with said reverse rotation on said scanned surface;
   a displaying means irradiated by said corrected image-forming light and displaying a two-dimensional image, wherein said correcting means comprises:

an angle detecting means for detecting a rotation angle of said scanning means, an angle data storing means for storing a predetermined one frame's worth of angle data at each time, with respect to a reference signal instructing said rotation, detected by said angle detecting means, a modulation controlling means for calculating a time with respect to said reference signal where said scanning means becomes a predetermined angle from said stored predetermined one frame's worth of angle data at each time and outputs a modulation instruction in accordance with said video data at the time where said predetermined angle is reached, wherein said correcting means further comprises:

a phase delay storing means for storing an amount of delay of phase required until obtaining angle data from said angle detecting means, a correcting means for replacing one frame's worth of angle data of each time detected by said angle detecting means with said one frame's worth of angle data of a time after a time in accordance with said amount of phase delay has elapsed, a light position measuring means, arranged detachably in a predetermined direction corresponding to a predetermined rotation angle of said scanning means, for detecting light rays deflected by said scanning means, a first angle measuring means for setting an angle so that light rays deflected by said scanning means strike said light position measuring means and measuring first angle data detected by said angle detecting means of said scanning means at a stop, a second angle measuring means for measuring second angle data detected by said angle detecting means of said scanning means when light rays deflected by said scanning means during rotation strike said light position measuring means, and a calculating means for comparing said first angle data and said second angle data and calculating an amount of delay of said phase.

5. An image display device as set forth in claim 4, wherein said angle data storing means stores one frame's worth of angle data in said forward rotation direction and one frame's worth of angle data in said reverse rotation direction in a memory.

6. An optical scanning device deflecting incident light modulated in accordance with video data and scanning by the incident light over a scanned surface to form an image, said optical scanning device comprising:

a scanning means which is rotated in a forward rotation direction and a reverse rotation direction and for deflecting said incident light in accordance with the forward rotation and the reverse rotation;

a correcting means for matching the position of the image formed by scanning by said incident light deflected in accordance with said forward rotation on said scanned surface and the position of the image formed by scanning by said incident light deflected in accordance with said reverse rotation on said scanned surface, wherein said correcting means comprises:

an angle detecting means for detecting a rotation angle of said scanning means, a light position measuring means, arranged detachably in a predetermined direction corresponding to a predetermined rotation angle of said scanning means, for detecting light rays deflected by said scanning means, a first angle measuring means for setting an angle so that light rays deflected by said scanning means strike said light position measuring means and measuring first angle data detected by said angle detecting means of said scanning means at a stop, a second angle measuring means for measuring second angle data detected by said angle detecting means of said scanning means when light rays deflected by said scanning means during rotation strike said light position measuring means, and a calculating means for comparing said first angle data and said second angle data and calculating an amount of delay of said phase.

7. An image display device comprising:

a light illuminating means;

a light modulation element for modulating incident light from said illuminating means in accordance with input video data and emitting image-forming light for forming a one-dimensional image;

a scanning means which is rotated in a forward rotation direction and a reverse rotation direction in accordance with said video data and for deflecting said image-forming light;

a correcting means for matching the position of an image formed by scanning by said image-forming light deflected in accordance with said forward rotation on said scanned surface and the position of an image formed by scanning by said image-forming light deflected in accordance with said reverse rotation on said scanned surface;

a displaying means irradiated by said corrected image-forming light and displaying a two-dimensional image, wherein said correcting means comprises:

an angle detecting means for detecting a rotation angle of said scanning means, a light position measuring means, arranged detachably in a predetermined direction corresponding to a predetermined rotation angle of said scanning means, for detecting light rays deflected by said scanning means, a first angle measuring means for setting an angle so that light rays deflected by said scanning means strike said light position measuring means and measuring first angle data detected by said angle detecting means of said scanning means at a stop, a second angle measuring means for measuring second angle data detected by said angle detecting means of said scanning means when light rays deflected by said scanning means during rotation strike said light position measuring means, and a calculating means for comparing said first angle data and said second angle data and calculating an amount of delay of said phase.

* * * * *

UNITED STATES PATENT AND TRADEMARK OFFICE
CERTIFICATE OF CORRECTION

PATENT NO.       : 7,079,297 B2
APPLICATION NO.  : 10/493231
DATED            : July 18, 2006
INVENTOR(S)      : Yoshitsugu Sakai It is certified that error appears in the above-identified patent and that said Letters Patent is hereby corrected as shown below:

Cover Page (73) Assignee:

Should Read:
-- (73)   Assignee:  Sony Corporation, (JP) --.

Signed and Sealed this

Twenty-third Day of January, 2007

JON W. DUDAS
*Director of the United States Patent and Trademark Office*